(12) United States Patent
Kim

(10) Patent No.: US 10,430,071 B2
(45) Date of Patent: Oct. 1, 2019

(54) OPERATION OF A COMPUTING DEVICE FUNCTIONALITY BASED ON A DETERMINATION OF INPUT MEANS

(71) Applicant: Samsung Electronics Co., Ltd., Gyeonggi-do (KR)

(72) Inventor: Geon-Soo Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 747 days.

(21) Appl. No.: 14/905,638

(22) PCT Filed: Jul. 25, 2014

(86) PCT No.: PCT/KR2014/006782
§ 371 (c)(1),
(2) Date: Jan. 15, 2016

(87) PCT Pub. No.: WO2015/012629
PCT Pub. Date: Jan. 29, 2015

(65) Prior Publication Data
US 2016/0162177 A1 Jun. 9, 2016

(30) Foreign Application Priority Data
Jul. 25, 2013 (KR) .................. 10-2013-0087853

(51) Int. Cl.
*G06F 3/0488* (2013.01)
*G06F 3/0482* (2013.01)
(Continued)

(52) U.S. Cl.
CPC ........ *G06F 3/04883* (2013.01); *G06F 3/0482* (2013.01); *G06F 3/04842* (2013.01); *G06F 9/451* (2018.02)

(58) Field of Classification Search
CPC .............. G06F 3/0482; G06F 3/04842; G06F 3/04883; G06F 9/451
See application file for complete search history.

(56) References Cited

U.S. PATENT DOCUMENTS 5,956,020 A * 9/1999 D'Amico .............. G06F 3/0418
345/173
6,204,837 B1 * 3/2001 Smith ..................... G06F 3/038
345/156
(Continued)

FOREIGN PATENT DOCUMENTS

| CN | 102609176 | 7/2012 |
| CN | 102693000 | 9/2012 |

(Continued)

OTHER PUBLICATIONS

PCT/ISA/237 Written Opinion issued on PCT/KR2014/006782 (pp. 4).

(Continued)

*Primary Examiner* — Eric J. Bycer
(74) *Attorney, Agent, or Firm* — The Farrell Law Firm, P.C.

(57) ABSTRACT

An electronic device, and a method of an electronic device, are provided. The method includes entering a first input mode that receives input with a first input means and a second input mode that receives input with a second input means; receiving a touch input from the first input means; and performing a predetermined function corresponding to the touch input. The function corresponding to the touch input is different based on whether the electronic device is in the first input mode or the second input mode.

13 Claims, 16 Drawing Sheets

(51) Int. Cl.
*G06F 3/0484* (2013.01)
*G06F 9/451* (2018.01)

(56) References Cited

U.S. PATENT DOCUMENTS

| | | | |
|---|---|---|---|
| 6,266,057 B1 | 7/2001 | Kuzunuki et al. | |
| 6,611,258 B1* | 8/2003 | Tanaka | G06F 3/0433 345/173 |
| 2005/0275638 A1* | 12/2005 | Kolmykov-Zotov | G06F 3/04883 345/179 |
| 2007/0177803 A1* | 8/2007 | Elias | G06F 3/04883 382/188 |
| 2007/0242056 A1* | 10/2007 | Engelhardt | G06F 3/0416 345/173 |
| 2008/0163130 A1* | 7/2008 | Westerman | G06F 3/04883 715/863 |
| 2008/0284743 A1* | 11/2008 | Hsu | G06F 3/0416 345/173 |
| 2009/0100383 A1* | 4/2009 | Sunday | G06F 3/04883 715/863 |
| 2010/0095205 A1 | 4/2010 | Kinoshita | |
| 2010/0182247 A1 | 7/2010 | Petschnigg et al. | |
| 2010/0283748 A1 | 11/2010 | Hsieh et al. | |
| 2011/0099299 A1* | 4/2011 | Vasudevan | G06F 3/048 710/14 |
| 2011/0169756 A1* | 7/2011 | Ogawa | G06F 3/03545 345/173 |
| 2011/0191704 A1 | 8/2011 | Hinckley et al. | |
| 2012/0110517 A1 | 5/2012 | Sparks et al. | |
| 2012/0154295 A1* | 6/2012 | Hinckley | G06F 3/04883 345/173 |
| 2012/0182322 A1 | 7/2012 | Yeh | |
| 2012/0218177 A1* | 8/2012 | Pang | G06F 3/0346 345/156 |
| 2012/0262411 A1 | 10/2012 | Ahn et al. | |
| 2012/0306927 A1 | 12/2012 | Lee et al. | |
| 2014/0354605 A1* | 12/2014 | Kurita | G06F 3/03545 345/179 |
| 2015/0138127 A1* | 5/2015 | Kurita | G06F 3/03545 345/173 |

FOREIGN PATENT DOCUMENTS

| | | |
|---|---|---|
| EP | 2 447 823 | 5/2012 |
| EP | 2 530 561 | 12/2012 |
| KR | 1020100020389 | 2/2010 |
| KR | 1020110110208 | 10/2011 |
| KR | 1020120035711 | 4/2012 |
| KR | 1020120081733 | 7/2012 |
| KR | 1020120118260 | 10/2012 |

OTHER PUBLICATIONS

PCT/ISA/210 Search Report issued on PCT/KR2014/006782 (pp. 3).
European Search Report dated Mar. 26, 2015 issued in counterpart application No. 14177665.8-1507, 6 pages.
Chinese Office Action dated May 3, 2018 issued in counterpart application No. 201480041692.2, 19 pages.
European Search Report dated Aug. 6, 2019 issued in counterpart application No. 14177665.8-1216, 8 pages.

* cited by examiner

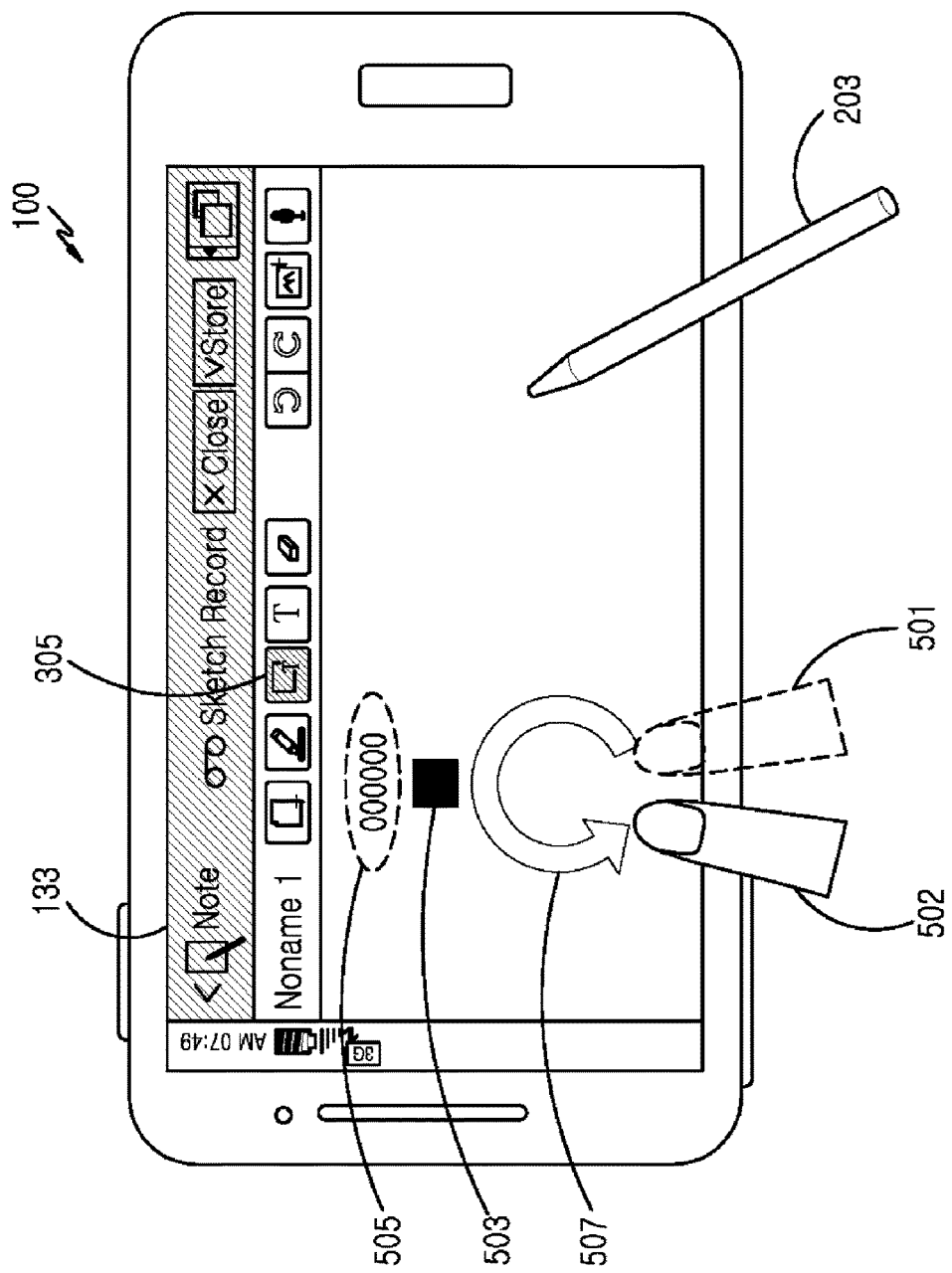
[Fig. 5a]

OPERATION OF A COMPUTING DEVICE FUNCTIONALITY BASED ON A DETERMINATION OF INPUT MEANS

TECHNICAL FIELD

The present invention relates generally to a method of processing an input and an electronic device thereof.

BACKGROUND ART

As multimedia technology develops and integrated technology of a circuit develops, electronic devices that use various multimedia functions have become smaller in size and are now very widely used. Moreover, an electronic device may have a communication function of mobile communication and may provide various additional services such as camera photographing, data communication, moving picture reproduction, audio reproduction, messenger, schedule management, and alarm functions, as well as an audio dedicated communication function. As a result, various programs that can use such functions are used and various input methods that can use a program installed in the electronic device exist.

Particularly, as touch screen technology of an electronic device develops, an instruction may be input on a touch screen using various input means such as a hand or a stylus pen. For example, a touch screen of an electronic device may include an input sensor that can input an instruction using an input means such as a hand and an input sensor that can input an instruction using an input means such as a stylus pen. When inputting an instruction on a touch screen using an input means such as a stylus pen, in order to not perform an input of an unintended instruction through an input means such as a hand, the electronic device may be controlled with a palm rejection function. When a user inputs an instruction on a touch screen using an input means such as a stylus pen, the user's hand may be positioned on the touch screen and thus a natural writing or drawing posture can be maintained using an input means such as a stylus pen and thus a delicate operation can be performed.

An electronic device having a palm rejection function offers an advantage in that it allows a user's hand to be freely positioned on a touch screen in a mode that inputs an instruction with a separate input means such as a stylus pen; however, there is a disadvantage in that it does not allow for the user to perform a touch input through a hand on the touch screen thereof.

DISCLOSURE OF INVENTION

Solution to Problem

The present invention has been made to solve at least the above-mentioned problems and/or disadvantages and to provide at least the advantages described below. Accordingly, an aspect of the present invention is to provide a method and apparatus which provides a function that can effectively use a hand touch input that does not handle an instruction of an input in a pen input mode.

Another aspect of the present invention is to provide a method and apparatus that can assist a function of a pen touch by giving a function to a hand touch gesture in a pen input mode.

In accordance with an aspect of the present invention, a method of operating an electronic device, the method includes entering a first input mode that receives input with a first input means; and entering a second input mode that receives input with a second input means; receiving a touch input from the first input means; and performing a function corresponding to the touch input, the function corresponding to the touch input being different based on whether the electronic device is in the first input mode or the second input mode.

The function corresponding to the touch input is different from a function corresponding to a touch input of the first input means when the second input mode is in an off state and when the first input mode is in an on state.

Preferably, the method further include performing at least one function selected with operation corresponding to the touch input, when receiving a touch input of the first input means while detecting the second input means.

Preferably, the function corresponding to the touch input is a function corresponding to an object selected from at least one object displayed on a touch screen based on the touch input.

Preferably, the touch input is a drag in consideration of at least one of a reference length and a reference time.

Preferably, the touch input includes: operation of touching a predetermined area of a touch screen of the electronic device; operation of dragging in one direction of an upward direction, a downward direction, a left direction, and a right direction of the touch screen while maintaining the touch; and operation of releasing the touch.

Preferably, the operation of dragging includes operation of focusing one of a plurality of objects displayed on the touch screen of the electronic device.

Preferably, the plurality of objects are icons arranged in parallel on the touch screen.

Preferably, the focusing object is changed according to a dragging operation.

Preferably, the touch input includes: operation of touching a predetermined area of the touch screen of the electronic device; operation of dragging while drawing a circular arc clockwise or counterclockwise while maintaining the touch; and operation of releasing the touch.

Preferably, the drag operation is maintained until an overlay image that draws a circular arc to correspond to the drag operation determines a virtual circle.

Preferably, the touch input includes: operation of touching a predetermined area of the touch screen of the electronic device; operation of drawing one shape of a text, a numeral, and a symbol while maintaining the touch; and operation of releasing the touch.

Preferably, the operation of drawing one shape of the text, the numeral, and the symbol determines touch release necessary for completing one shape of the text, the numeral, and the symbol by dragging with one operation other than the touch release.

Preferably, the operation of drawing one shape of the text, the numeral, and the symbol is complete within a predetermined time period.

In accordance with another aspect of the present invention, an electronic device includes a touch screen; and at least one processor, wherein in a state that enters a first input mode that receives input with a first input means, and a second input mode that receives input with a second input means, the processor processes to receive a touch input of the first input means and controls to perform a function corresponding to the touch input, and the function corresponding to the touch input is different based on whether the input mode of the electronic device is the first input mode or the second input mode.

In accordance with another aspect of the present invention, an electronic device includes at least one processor; a touch screen; a memory; and at least one program stored at the memory and executed by the at least one processor, wherein in a state that enters a first input mode that receives input with a first input means, and a second input mode that receives input with a second input means, the program includes an instruction that processes to receive a touch input of the first input means and that processes to perform a predetermined function corresponding to the touch input, and the function corresponding to the touch input is different based on whether the input mode of the electronic device is the first input mode or the second input mode.

BRIEF DESCRIPTION OF DRAWINGS

The above and other aspects, features and advantages of the present invention will be more apparent from the following detailed description taken in conjunction with the accompanying drawings, in which:

FIGS. 5A and 5B are diagrams illustrating an operation based on an input in the electronic device according to an embodiment of the present invention;

BEST MODE FOR CARRYING OUT THE INVENTION

Hereinafter, various embodiments of the present invention will be described herein below with reference to the accompanying drawings. In the following description, well-known functions or constructions are not described in detail since they would obscure the invention in unnecessary detail. Also, the terms used herein are defined according to the functions of the present invention. That is, the terms used herein must be understood based on the descriptions made herein.

When describing various embodiments of the present invention, an electronic device will be described based on a touch screen that can perform an input process through an input device and a display process through a display unit on a screen of the electronic device. Therefore, in a device configuration of the present invention, even if a display unit and an input device are separately shown, when representing the display unit, the display unit may include the input device or the input device may be represented with the display unit.

The present invention is not limited to only an electronic device including a touch screen and may be applied to various electronic devices in which the display unit and the input device are physically separate or that include only one of the display unit and the input device. Hereinafter, in various embodiments, a device having a touch screen may represent an electronic device having a touch screen may be an electronic device including a touch screen which includes a display and a touch input device, a display unit which does not include a touch input device, or a display unit including a touch input device.

In the following description, an electronic device 100 includes a mobile communication terminal, a Personal Digital Assistant (PDA), a Personal Computer (PC), a laptop computer, a smart phone, a smart TV, a Netbook, a Mobile Internet Device (MID), an Ultra Mobile PC (UMPC), a tablet PC, a mobile pad, a media player, a hand-held computer, a navigation device, a smart watch, a Head-Mounted Display (HMD), and a Moving Picture Experts Group layer-3 (MP3) player.

Throughout this specification and the claims that follow, when an element is described as "connected" or "coupled" to another element, it should be understood that the element may be directly connected or coupled to the other element or electrically coupled to the other element through a third element. In contrast, when an element is described as "directly connected" or "directly coupled" to another element, it should be understood that there are no intermediate components between the two elements.

Figure 1:
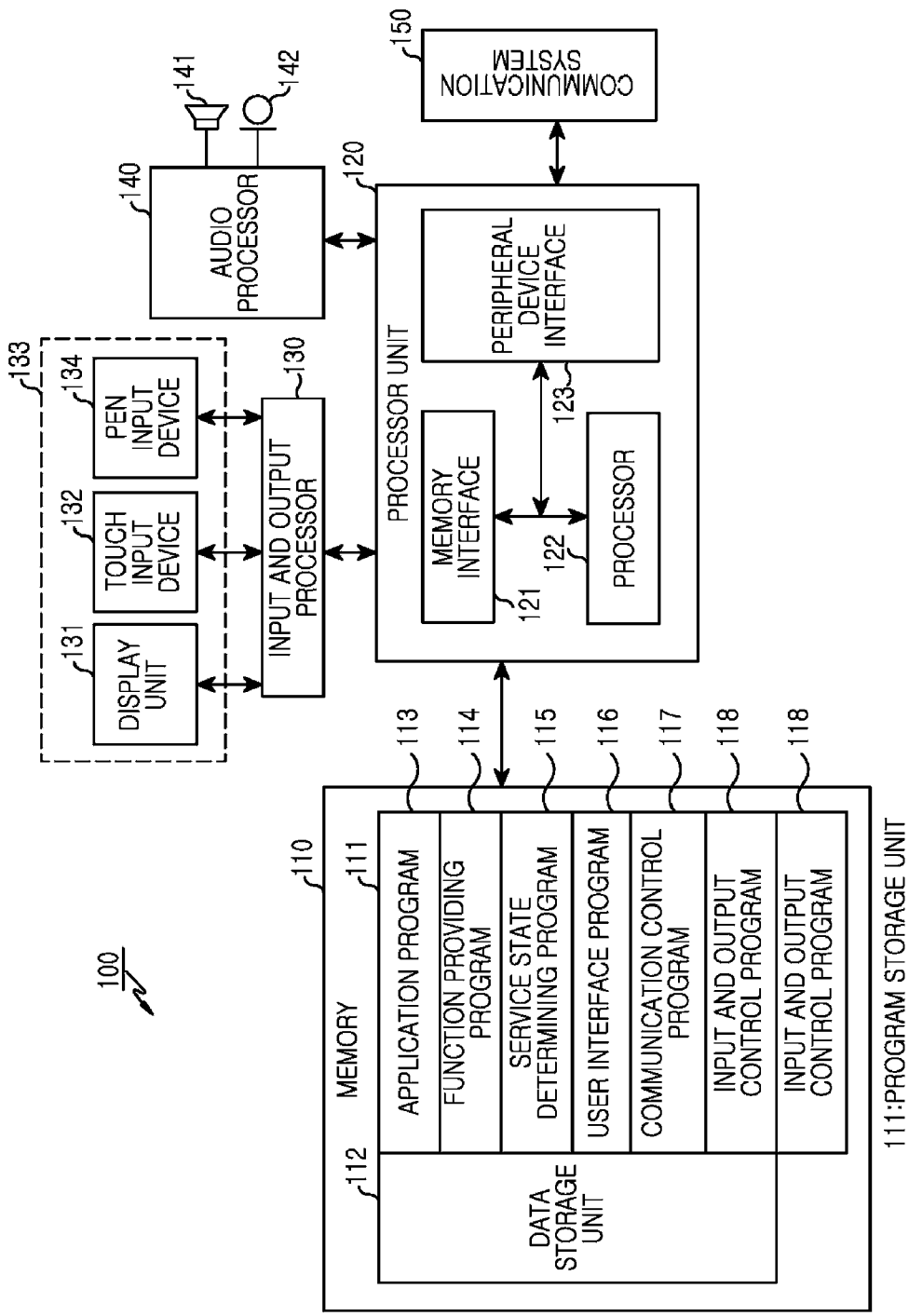
FIG. 1 is a block diagram illustrating a configuration of an electronic device according to various embodiments of the present invention.

FIG. 1 is a block diagram illustrating a configuration of an electronic device according to various embodiments of the present invention.

Referring to FIG. 1, an electronic device 100 includes a memory 110 and a processor unit 120, and a peripheral device may include an input and output processor 130, a display unit 131, a touch input device 132, an audio processor 140, a communication system 150, and other peripheral devices.

The memory 110 includes a program storage unit 111 that stores a program for controlling operation of the electronic device 100 and a data storage unit 112 that stores data generated while performing a program and may store data generated in a program with operation of a processor 122.

For example, the data storage unit 112 stores data of a gesture which a user of the electronic device 100 inputs on a touch screen 133 with the first input means in a first input means input mode.

Further, the data storage unit 112 stores data about a function of the electronic device 100 that is set by an operation corresponding to a gesture which a user of the electronic device 100 inputs on the touch screen 133 with the first input means in a first input means input mode.

In another example, the data storage unit 112 stores information about a gesture which a user of the electronic device 100 inputs on the touch screen 133 with a second input means while in a second input means input mode.

Further, the data storage unit 112 stores data about a function of the electronic device 100 that is set by an operation corresponding to a gesture which a user of the electronic device 100 inputs on the touch screen 133 with a second input means while in a second input means input mode.

In another example, the data storage unit 112 stores data about a gesture which a user of the electronic device 100 inputs on the touch screen 133 with the first input means while in a second input means input mode.

The program storage unit 111 includes at least one application program 113, a function providing program 114, a service state determining program 115, a user interface (UI) program 116, a communication control program 117, and an input and output control program 118. Here, a program included in the program storage unit 111 may be formed with a set of instructions to be represented with an instruction set.

The function providing program 114 controls a touch input mode (hereinafter, referred to as a 'first input means input mode', which inputs using the first input means) or a pen input mode (hereinafter, referred to as a 'second input means input mode', which inputs using a second input means), which is a method of inputting an instruction on the touch screen 133 of the electronic device 100.

For example, when the electronic device 100 operates in the second input means input mode, if the electronic device 100 receives an input of the first input means through the touch screen 133, the electronic device 100 does not perform a predetermined operation corresponding to the input of the first input means.

In another example, when the electronic device 100 operates in the second input means input mode, if the electronic device 100 receives an input of the first input means through the touch screen 133, and the electronic device 100 controls to perform a predetermined operation for a second input means input mode corresponding to the input of the first input means.

Here, when the electronic device 100 is in a common touch input mode instead of the second input means input mode, if an operation corresponding to a first input of the first input means is a first operation, the predetermined operation may be a second operation corresponding to a first input of the first input means to operate in a second input means input mode.

The function providing program 114 determines a gesture that drags in an upward direction, a downward direction, a left direction, or a right direction that is input on the touch screen 133 in a second input means input mode of the electronic device 100 and an operation or a function of the electronic device 100 corresponding to the gesture, stores corresponding information at the memory 110, and performs a corresponding operation or function of the electronic device 100 when a user inputs the gesture that drags in the upward direction, downward direction, left direction, or right direction with the first input means in the second input means input mode.

In another example, while in a second input means input mode of the electronic device 100, the electronic device 100 determines a gesture that drags a text, a numeral, or a symbol that is input on the touch screen 133 and an operation or a function of the electronic device 100 corresponding to the gesture, stores corresponding information at the memory 110, and performs a corresponding operation or function of the electronic device 100 when a user inputs the gesture that drags the text, numeral, or symbol with the first input means while in the second input means input mode.

Further, when the electronic device 100 determines a gesture that is input on the touch screen 133 in the second input means input mode, the electronic device 100 may determine the gesture through an overlay image or a trajectory that drags the touch screen 133 with the first input means.

The service state determining program 115 includes at least one software element for determining a state of a service provided by a program or constituent elements of the electronic device 100.

The UI program 116 includes at least one instruction software element for providing a UI in the electronic device 100.

For example, the electronic device 100 forms a UI object of an overlay image or a trajectory that drags with the first input means or the second input means that inputs on the touch screen 133 in a second input means input mode and display the UI object on the touch screen 133.

In another example, the electronic device 100 performs an operation corresponding to a gesture that drags with the first input means that is input on the touch screen 133 in a second input means input mode, forms a UI object about information of a performed operation or a result of an operation, and displays the UI object on the touch screen 133.

The input and output control program 118 displays an operation of the electronic device 100 in the display unit 131 and receives an input of an operation instruction of the electronic device 100 through the touch input device 132.

The communication control program 117 includes at least one software element for controlling communication with at least one second electronic device using the communication system 150.

For example, the communication control program 117 searches for a second electronic device for connecting communication. When a second electronic device for connecting communication is found, the communication control program 117 sets a connection for communication with the second electronic device. Thereafter, by performing a performance search and a session setting procedure with the connected second electronic device, the communication control program 117 controls to transmit and receive data to and from the second electronic device through the communication system 150.

The application program 113 includes a software element of at least one application program installed at the memory 110 of the electronic device 100.

The memory 110 included in the electronic device 100 may be formed in at least one or in multiple memories. Further, the memory 110 may perform a function of only the program storage unit 111, a function of only the data storage unit 112, or both functions according to use. Additionally, a physical area within the memory 110 may not be clearly divided in view of a device characteristic.

The processor unit 120 includes a memory interface 121, at least one processor 122, and a peripheral device interface 123. The memory interface 121, the at least one processor 122, and the peripheral device interface 123 included in the processor unit 120 may be integrated in at least one circuit or may be embodied with a separate constituent element.

The memory interface 121 controls a constituent element such as the processor 122 or the peripheral device interface 123 to access to the memory 110.

The peripheral device interface 123 controls a connection between an input and output peripheral device, the processor 122, and the memory interface 121 of the electronic device 100.

The processor 122 controls the electronic device 100 to provide a service such as various multimedia communication using at least one software program and to display a UI operation of the electronic device 100 to the display unit 131 through the input and output processor 130. The processor 122 also controls an input device (not shown) or the touch input device 132 to provide a service that receives an input of an instruction from the input device or the touch input device 132. In this case, by executing at least one program stored at the memory 110, the processor 122 controls to provide a service corresponding to the stored program.

The audio processor 140 provides an audio interface between a user and the electronic device 100 through a speaker 141 and a microphone 142.

For example, the electronic device 100 may control to input a predetermined voice instruction to the microphone 142 and may control to output notification of a service that performs in the electronic device 100 as sound through the speaker 141.

The communication system 150 performs a communication function. The communication system 150 may perform communication with a second electronic device using at least one of wireless LAN communication, wired communication, and short Range wireless communication such as Infrared Data Association (IrDA), Bluetooth™, and Wi-Fi through a base station.

The input and output processor 130 provides an interface between an input and output device such as the display unit 131 and the touch input device 132 and the peripheral device interface 123.

The input device (not shown) provides input data occurring by a user's selection to the processor unit 120 through the input and output processor 130.

For example, in order to receive data for the processor 122 to control, the input device may be formed with only a control button or may be formed with a keypad.

In another example, the input device (not shown) may be included and provided in the display unit 131, as in the touch screen 133. In this case, the input device (not shown) may use a capacitive type, a resistive (pressure detection) type, an infrared ray type, an electromagnetic induction type, and an ultrasonic wave type.

The display unit 131 receives, from the processor unit 120, state information of the electronic device 100, a text, a moving picture, or a still picture (hereinafter, a moving picture or a still picture may be referred to as an 'image') that is input from a UI operation, and displays the UI operation through the input and output controller 131.

The touch screen 133 is a device that physically couples the touch input device 132 and/or a pen input device 134 on the display unit 131 and may input an instruction by touching a screen or a configuration displayed on the display unit 131 when operating the electronic device 100.

Therefore, the touch screen 133 may perform both functions of the display unit 131 that displays an UI operation of the electronic device 100 and the touch input device 132 that inputs an external instruction to the electronic device 100 and thus in the following description, the display unit 131 of the touch screen 133 and the touch input device 132 of the touch screen 133 are represented with the touch screen 133.

When the touch input device 132 performs an operation of touching at least one time a surface of the touch screen 133 and dragging while maintaining the touch with a first input means that can input with an input method corresponding to at least one of a capacitive type, a resistive type, an infrared ray type, an electromagnetic induction type, and an ultrasonic wave type. Alternatively, the touch input device 132 performs an operation of moving the first input means in a state that separately positions the first input means a predetermined distance from a surface of the touch screen 133. Additionally, the touch input device 132 may be formed with a first sensor that detects the operation and that receives an input of a predetermined signal.

When performing an operation of touching at least one time a surface of the touch screen 133 and dragging while maintaining the touch with a second input means that can input an instruction with a predetermined method with the electronic device 100 or an operation of moving a second input means in a state that positions the second input means a predetermined distance from a surface of the touch screen 133, the pen input device 134 may be formed with a second sensor that detects the operation and that receives an input of a predetermined signal.

When inputting an instruction on the touch screen of the electronic device 100, a state that can input an instruction on the touch input device 132 using the first input means may represent a state in which a user of the electronic device 100 enters a touch input mode or a state which turns on a touch input mode. Similarly, a state that can input an instruction to the pen input device 134 using the second input means may represent a state in which the user of the electronic device 100 enters a pen input mode or a state which turns on a pen input mode. A state that cannot input an instruction to the touch input device 132 using the first input means or a state that cannot input an instruction to the pen input device 134 using the second input means may represent an entry release of the touch/pen input mode or off the touch/pen input mode.

Inputting an instruction with a predetermined method using the electronic device 100 refers to an input method which does not allow input of an instruction to the touch input device 132 where such input is among a capacitive type, a resistive type, an infrared ray type, an electromagnetic induction type, and an ultrasonic wave type, but allows input of an instruction using at least one of short range wireless communication Such as IrDA, Bluetooth™ communication and Wi-Fi communication.

Further, the electronic device 100 may transmit and receive predetermined instruction data to and from the second input means through an input device of a touch sensor (not shown) or a physical button (not shown) attached to the second input means in addition to the method.

According to an embodiment of the present invention, in a state in which the touch input device 132 and the pen input device 134 are simultaneously turned on, the first input means cannot input an instruction to the pen input device 134 and the second input means cannot input an instruction to the touch input device 132.

When describing an embodiment of the present invention, a display to the electronic device 100 or an output to the electronic device 100 may be performed using a method of displaying a moving picture, a still picture, or a GUI operation on the touch screen 133 or on a second display unit of the electronic device 100 or a method of outputting audio such as a signal sound or a voice with the speaker 141. In the following description, the terms display or output may be used interchangeably, and when it is necessary to distinguish these terms, the terms will be separately described.

Figure 2A:
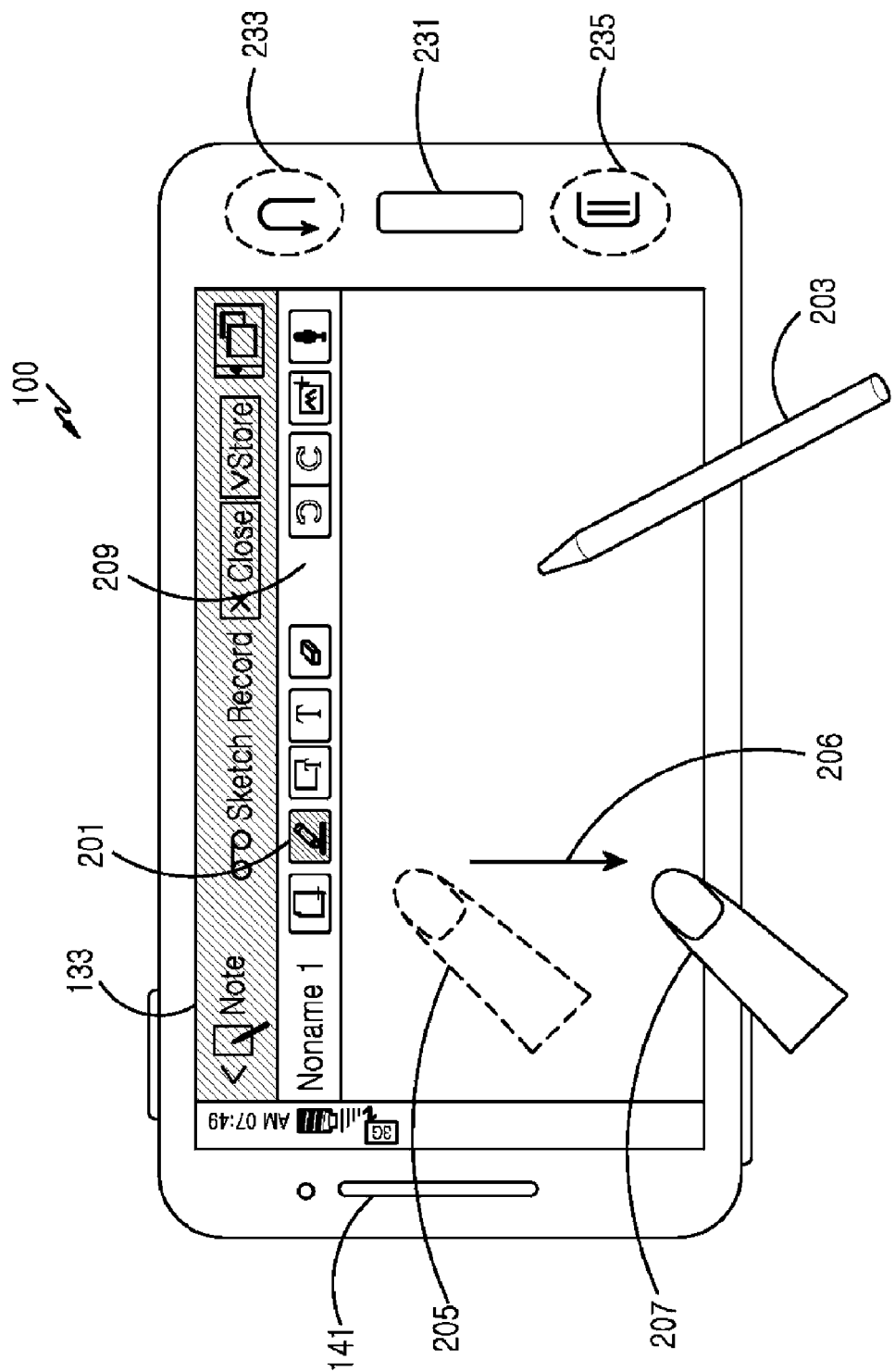
FIGS. 2A to 2C are diagrams illustrating an operation based on an input in the electronic device according to an embodiment of the present invention.
Figure 2B:
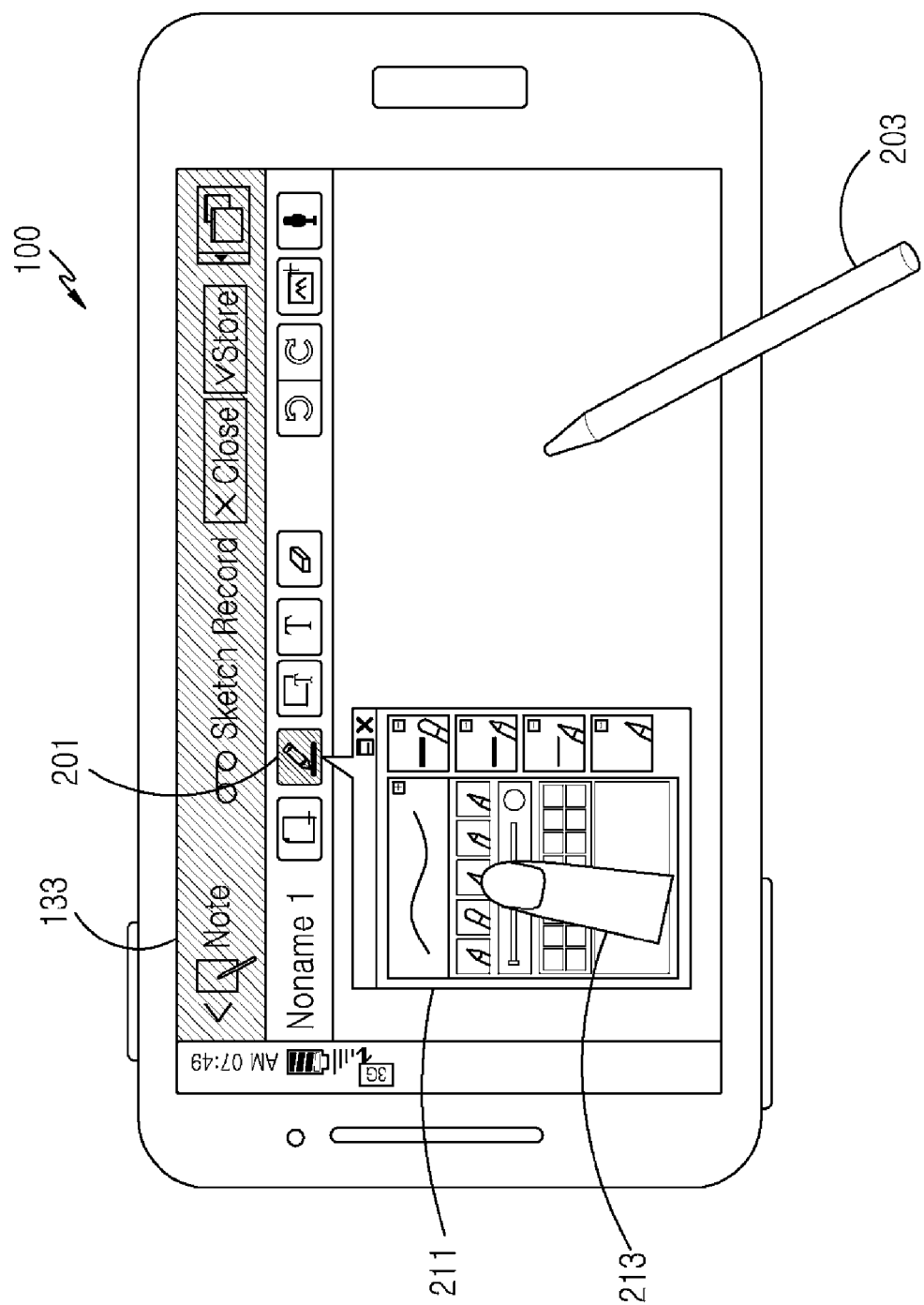
Figure 2C:
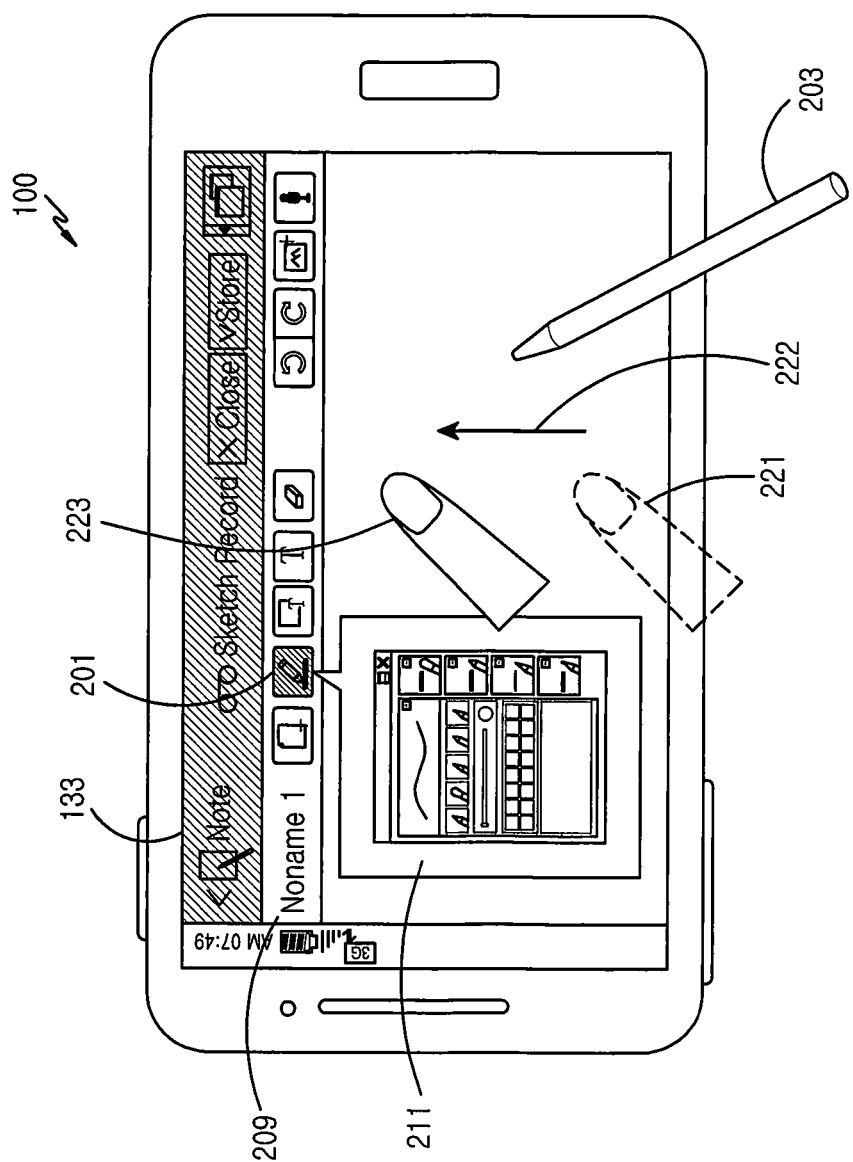

FIGS. 2A to 2C are diagrams illustrating an operation based on an input in the electronic device according to an embodiment of the present invention.

The electronic device 100 performs an operation corresponding to a predetermined input of the first input means such as a hand in a mode that allows for inputs through a touch screen of the electronic device 100 along with a predetermined second input means such as a stylus pen, an electronic pen, or a free touch pen.

For example, the electronic device 100 may perform a predetermined operation through a multi-touch (the act of performing a touch multiple times within a predetermined time period) gesture that touches a predetermined area of the touch screen 133 with the first input means, such as a hand and that drags while maintaining the touch and then releases the touch. Further, various operations of the electronic device 100 may be determined and performed according to a direction of the multi-touch gesture that drags while maintaining the touch.

With reference to FIGS. 2A to 7B, in the electronic device 100, a description may be provided through the use of a drawing program (not shown) that may draw a picture, a numeral, or a text on the touch screen 133 through a gesture input with the first input means and/or the second input means.

Referring to FIG. 2A, the electronic device 100 includes the touch screen 133 at a front surface. The touch screen 133 includes, for example, a display unit 131 that can display contents about an operation of the electronic device 100 with a UI, a touch input device 132 that can input an instruction by dragging the touch screen 133 with the first input means or by moving the first input means at a position separated by a predetermined distance from the touch screen 133, and the pen input device 134 that can input an instruction by dragging the touch screen 133 with a second input means or by moving the second input means at a position separated by a predetermined distance from the touch screen 133.

At the left side of the electronic device 100 shown in FIG. 2A, a speaker 141 that outputs a sound may be formed, and at the right side of the electronic device 100, a button 231, which is one of input devices may be formed, and a touch button 233 or 235 that can input an instruction through a touch at a fixed position may be formed. The electronic device 100 may include the speaker 141, the button 231, or the touch buttons 233 and 235 at the same position or different positions.

Referring to FIG. 2A, the electronic device 100 displays a UI operation of a second input means input program that performs an operation of a second input means input mode. When displaying a UI operation configuration of a second input means input, the electronic device 100 provides various functions necessary for a gesture input that draws a picture or that writes a text through the touch screen 133 of the electronic device 100 with a second input means 203 and displays a menu 209 that provides the various functions. The menu may include functions to select a tool for a drawing function, for setting an inputting figure and for setting hand writing (i.e., inputting text by drawing through the second input means), and to input a text.

A selection operation corresponding to a one time touch gesture input through the first input means such as a hand or a screen scroll operation, where touch gesture touches 205 a predetermined area of the touch screen 133 and drags 206 while maintaining the touch and that releases the touch at a position 207, may be a predetermined operation of the first input means in a state other than a second input means input mode of the electronic device 100. In a second input means input mode or when detecting a second input means in the second input means input mode, the electronic device 100 controls not to perform a predetermined operation of the first input means and to determine and perform other operations corresponding to various gestures of the first input means.

Referring to FIG. 2A, according to an embodiment of the present invention, while the electronic device 100 is in a state other than an input mode of the second input means 203, a gesture that touches 205 a predetermined area of the touch screen 133 and that drags 206 a reference length (a predetermined length) or more in a downward direction while maintaining the touch and that releases the touch at the position 207 may be performed. In such a case, the electronic device 100 controls to display the contents of a focused on function icon 201 in the menu 209 instead of performing a scroll operation which otherwise would be performed when the electronic device is in a state other than an input mode of the second input means 203 and the same touch gesture is applied.

According to an embodiment of the present invention, when a user of the electronic device 100 inputs an instruction through the pen input device 134 with the second input means, the electronic device 100 detects the second input means, but may determine that the detection is not an instruction. For example, the second input means may detect a predetermined vertical length from the input device 134, but may determine that the length falls within a range that is not determined as an instruction. Similarly, when the user of the electronic device 100 inputs an instruction through the touch input device 132 with the first input means, the electronic device 100 also detects the first input means, but may determine that the detection is not an instruction. For example, the first input means may detect a position of the first input means and may determine that the first input means is positioned in a range that is not determined as an instruction.

Hereinafter, as described above, when the electronic device 100 is not in a second input means input mode and is not detecting a second input means, the electronic device 100 performs an operation corresponding to an input of the first input means while the electronic device is in a state (a state of a general first input means input mode) other than a second input means input mode. The electronic device 100 determines the operation corresponding to an input of the first input means based on whether a second input means is detected in a second input means input mode.

Further, the operation of dragging while maintaining a touch with the first input means on the touch screen 133 is not limited to a drag of a reference length or more and may be a drag according to a reference time or may use a combination of a reference time and a reference length.

For example, when a gesture input that drags on the touch screen 133 with the first input means is being performed, if the electronic device 100 performs a function of the electronic device 100 corresponding to the input, a reference length may be determined to be a drag of ⅓ or more along the width of the device as opposed to the length on the touch screen 133 or a drag initiated 1 cm from a circumferential edge of the touch screen 133, continuing for 1 cm or more, and then releasing the touch.

The reference time may be determined with a method of touching on the touch screen 133 with the first input means, dragging for 1 second or more, dragging after maintaining the touch for 1 second, or dragging for 0.5 seconds or more after maintaining the touch for 0.5 seconds and then releasing the touch.

Further, when using a multimedia reproduction program according to an embodiment of the present invention, the function or operation of the electronic device 100 corresponding to an input of the first input means on the touch screen 133 according to a program used in a second input means input mode is not limited to the displaying of the contents of the focused on function icon 201 in the menu 209. Instead, the electronic device 100 may perform various functions or operations that control a magnitude of a sound that outputs to the speaker 141.

Referring to FIG. 2B, the electronic device 100 performs an operation corresponding to an input of the first input means while in a second input means input mode.

In a state of not performing an input of the first input means while in a second input means input mode, the electronic device 100 determines a specific gesture input through the first input means and control to perform a corresponding operation.

For example, the electronic device 100 may display a content 211 of a focused on function icon 201, from menu 209 that provides various functions, that can set a tool of a drawing function based on a predetermined gesture that touches 205 a predetermined area of the touch screen 133 with the first input means and that drags 206 in a downward direction and that releases the touch at the position 207, as shown in FIG. 2A.

Referring to FIG. 2B, the user of the electronic device 100 may select a desired service from the content 211 using the first input means. The electronic device 100 may not perform an operation corresponding to a one point touch gesture of the first input means in a second input means input mode. However, the electronic device 100 may control to perform operation 213 that allows the user to select a service from the content 211 using a predetermined gesture of the first input means with a one point touch while in a second input means input mode.

Referring to FIG. 2C, the electronic device 100 controls to allow a user to perform a predetermined gesture of the first input means on the touch screen 133 that displays the content 211 while operating in a second input means input mode, as shown in FIG. 2B.

For example, the electronic device 100 releases display of the content 211 based on a gesture that touches 221 a predetermined area of the touch screen 133 with the first input means and that drags 222 a reference length or more in a upward direction while maintaining the touch and that releases the touch at a position 223.

The electronic device 100 determines to display a content 211 of a focused on function icon 201 with an operation corresponding to a gesture that touches a predetermined area of the touch screen 133 and that drags upward or downward while maintaining the touch and that releases the touch with an input of the first input means while in a second input means input mode. The electronic device 100 may determine that a one point touch can not be performed while in a second input means input mode.

The electronic device 100 includes menu 209 that provides various functions displayed on the touch screen 133 of the electronic device 100 as well as a content 211 of a focused on function icon 201 that can set a tool of a drawing function while using a second input means input mode and displays the content 211 of the focused on function icon by performing a predetermined gesture through the first input means on the touch screen 133.

Figure 3A:
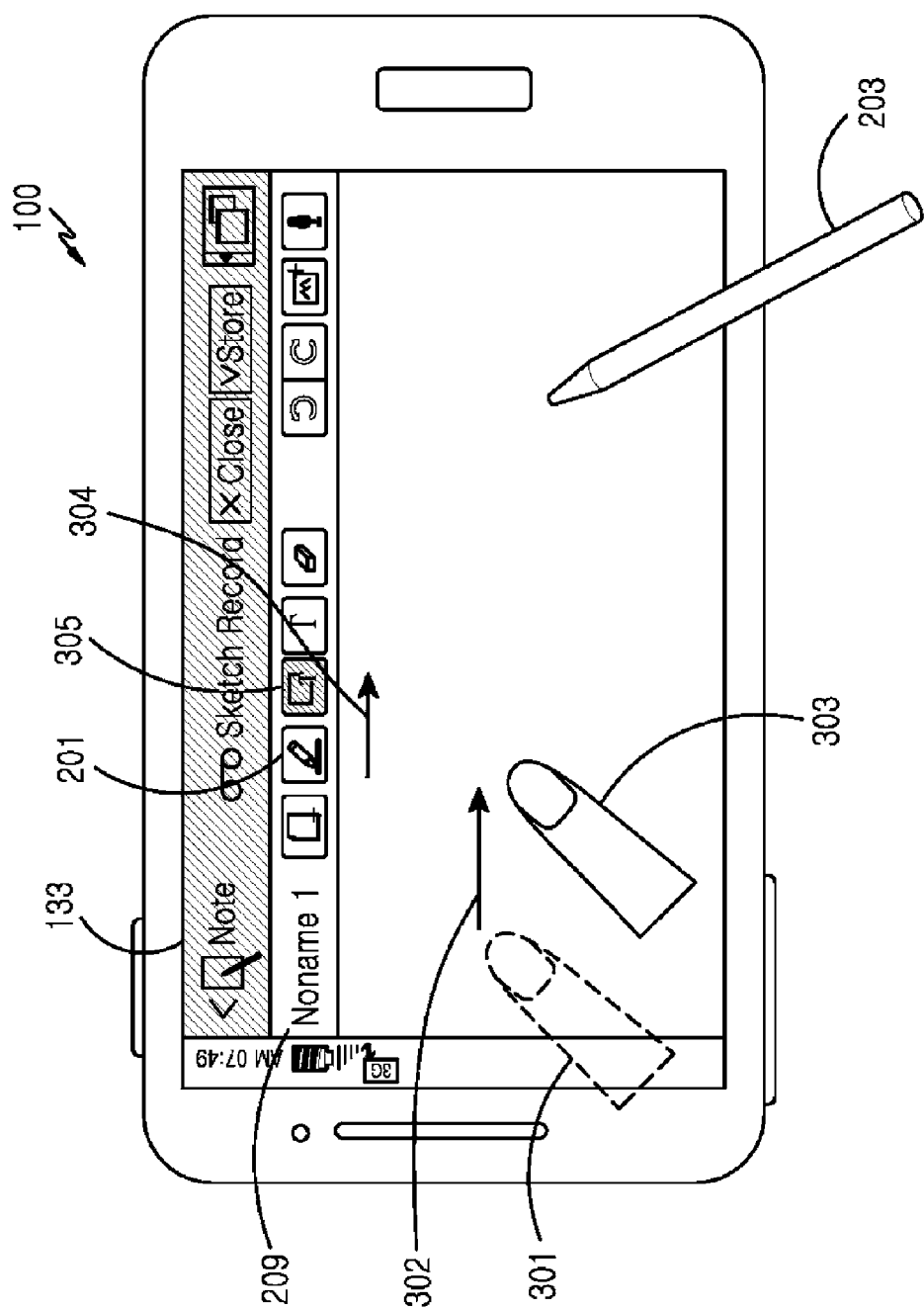
FIGS. 3A and 3B are diagrams illustrating an operation based on an input in the electronic device according to an embodiment of the present invention.
Figure 3B:
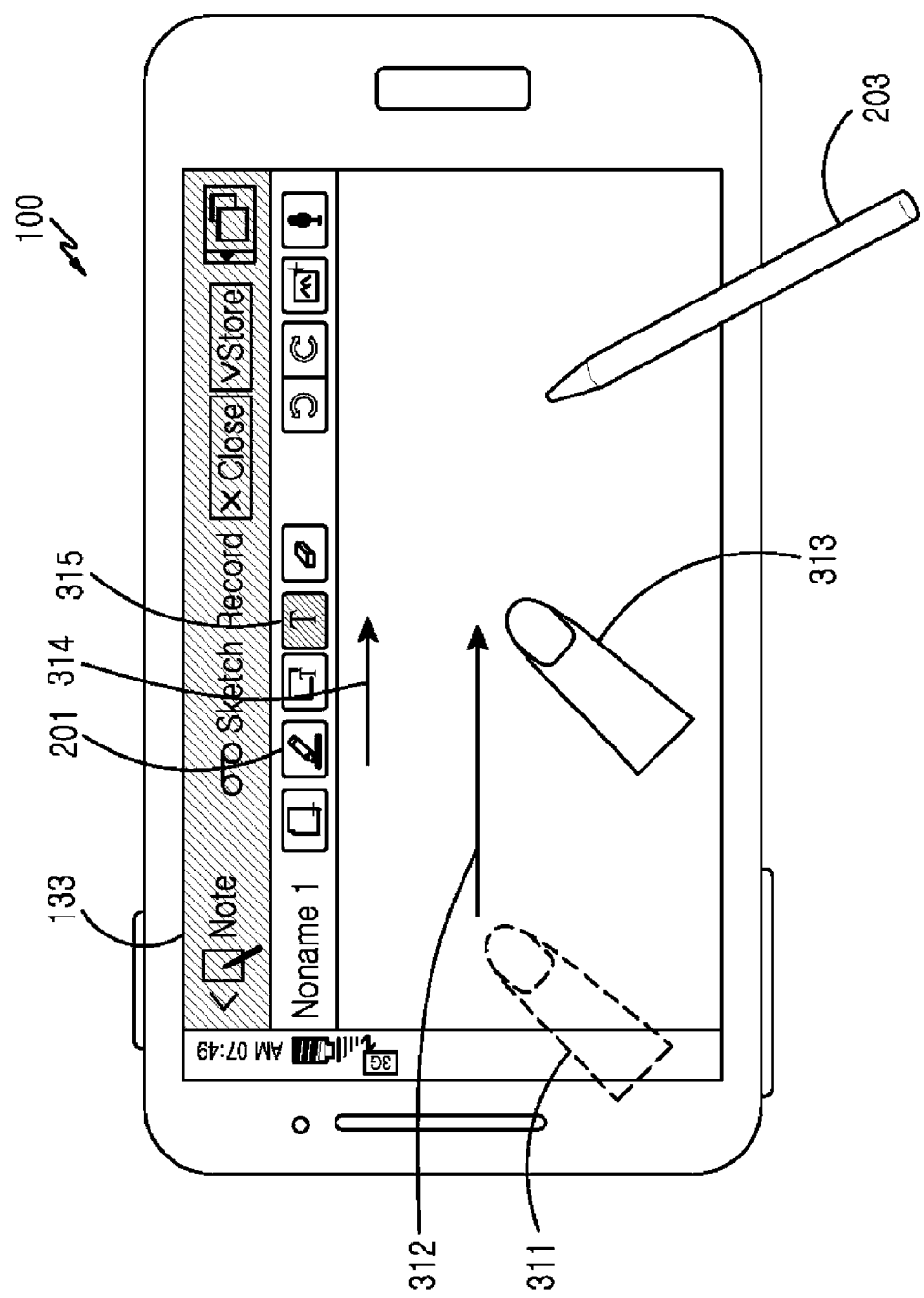

FIGS. 3A and 3B are diagrams illustrating an operation based on an input in the electronic device according to an embodiment of the present invention.

The electronic device 100 previously determines an operation corresponding to a predetermined gesture while in a second input means input mode. The predetermined gesture is one that touches a predetermined area of the touch screen 133 with an input of the first input means and that drags a reference length or more in a left direction or a right direction while maintaining the touch and that releases the touch. A function corresponding to a gesture of the first input means is performed based on the predetermined gesture using the first input means while in a second input means input mode of the electronic device 100.

Referring to FIG. 3A, through an input of the first input means, the electronic device 100 may change functions included in the menu 209 that provides various functions displayed on the touch screen 133.

For example, while in a second input means input mode, a user of the electronic device 100 may perform a gesture that touches 301 a predetermined area of the touch screen 133 with the first input means and that drags 302 a reference length or more in a right direction while maintaining the touch and that releases the touch at a position 303. The electronic device 100 changes focusing 304 from the focused on function icon 201 to the function icon 305 that can set an inputting figure or the function icon 315 that can set hand writing, positioned to the right side of the focused on function icon 201.

The electronic device 100 determines an operation of changing focusing 304 of a function icon of the menu 209 based on a gesture of a drag 302 of a reference length or more in a right direction while maintaining the touch on an icon positioned in a right direction.

Referring to FIG. 3B, while in a second input means input mode a gesture may be performed that touches 301 a predetermined area of the touch screen 133 with the first input means and that drags 302 a reference length or more in a right direction while maintaining the touch and that releases the touch at the position 313. A gesture that drags a length longer than a reference length of the drag 302, may also be performed.

When dragging a length corresponding to a reference length of the drag 302, as shown in FIG. 3A, the electronic device 100 changes focusing to a function icon 305 positioned immediately to the right side of an already focused on function icon 201, as shown in 304 of FIG. 3A. When dragging a length longer than a reference length of the drag 302, the electronic device 100 changes focusing to an function icon 315 positioned at a second position to the right side of the already focused on function icon 201, as shown in a drag 314 of FIG. 3B.

By using the first input means and by controlling a length of a drag (hereinafter, referred to as touch, drag and touch release) the first input means, as shown in 304 of FIG. 3A or 312 of FIG. 3B, the electronic device 100 changes focusing to a function icon positioned to the right side of an already focused on function icon 201.

Further, using the first input means, the electronic device 100 may determine a method of dragging to the left side as well as a method of dragging to the right side, as shown in 304 of FIG. 3A or 312 of FIG. 3B, and changes focusing to a function icon positioned to the left side of an already focused on function icon.

Further, using the first input means, the electronic device 100 may determine a method of dragging to focus on vertically positioned function icons or on function icons positioned in a figure such as a circle or a quadrangle.

Figure 4A:
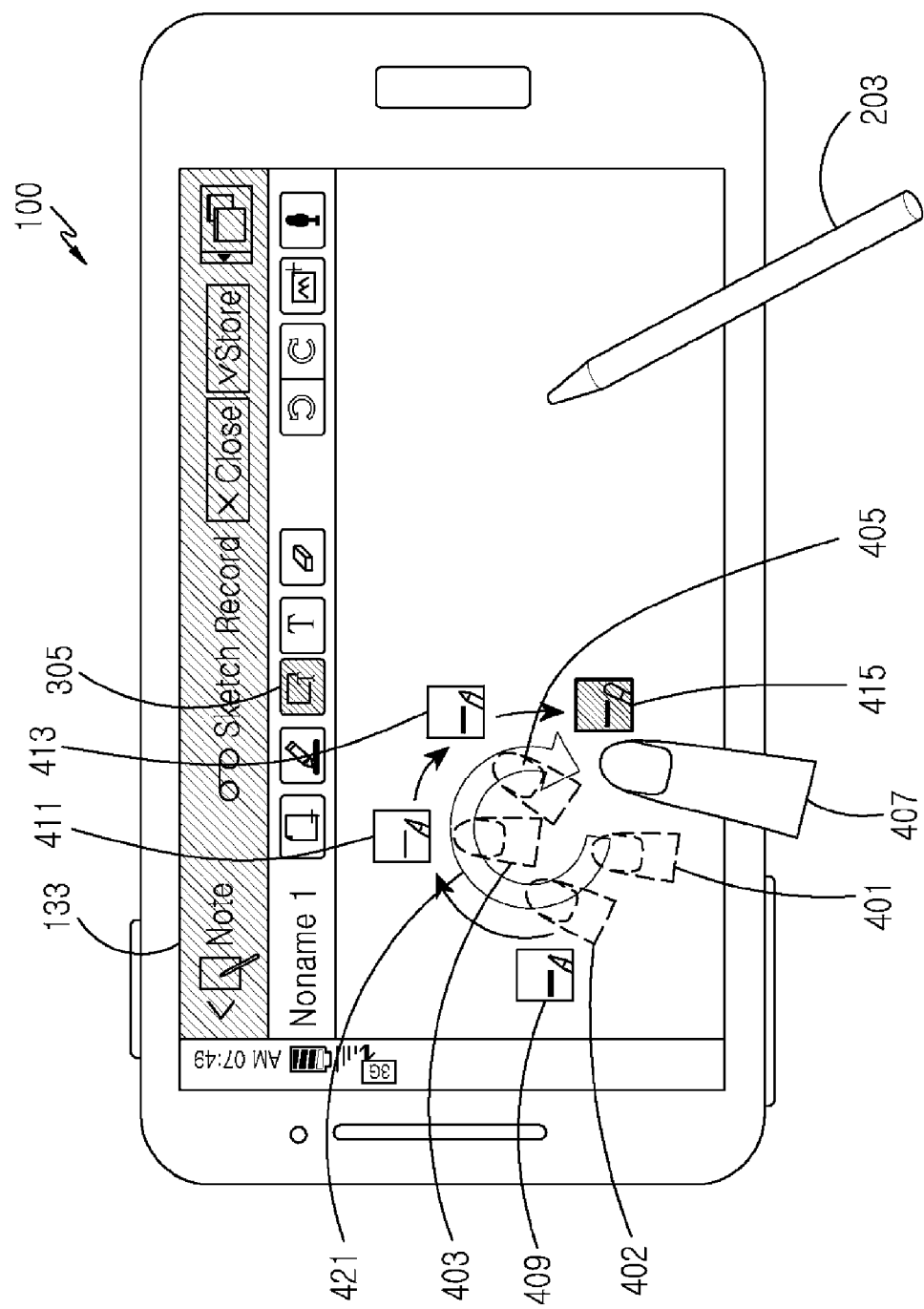
FIGS. 4A and 4B are diagrams illustrating an operation based on an input in the electronic device according to an embodiment of the present invention.
Figure 4B:
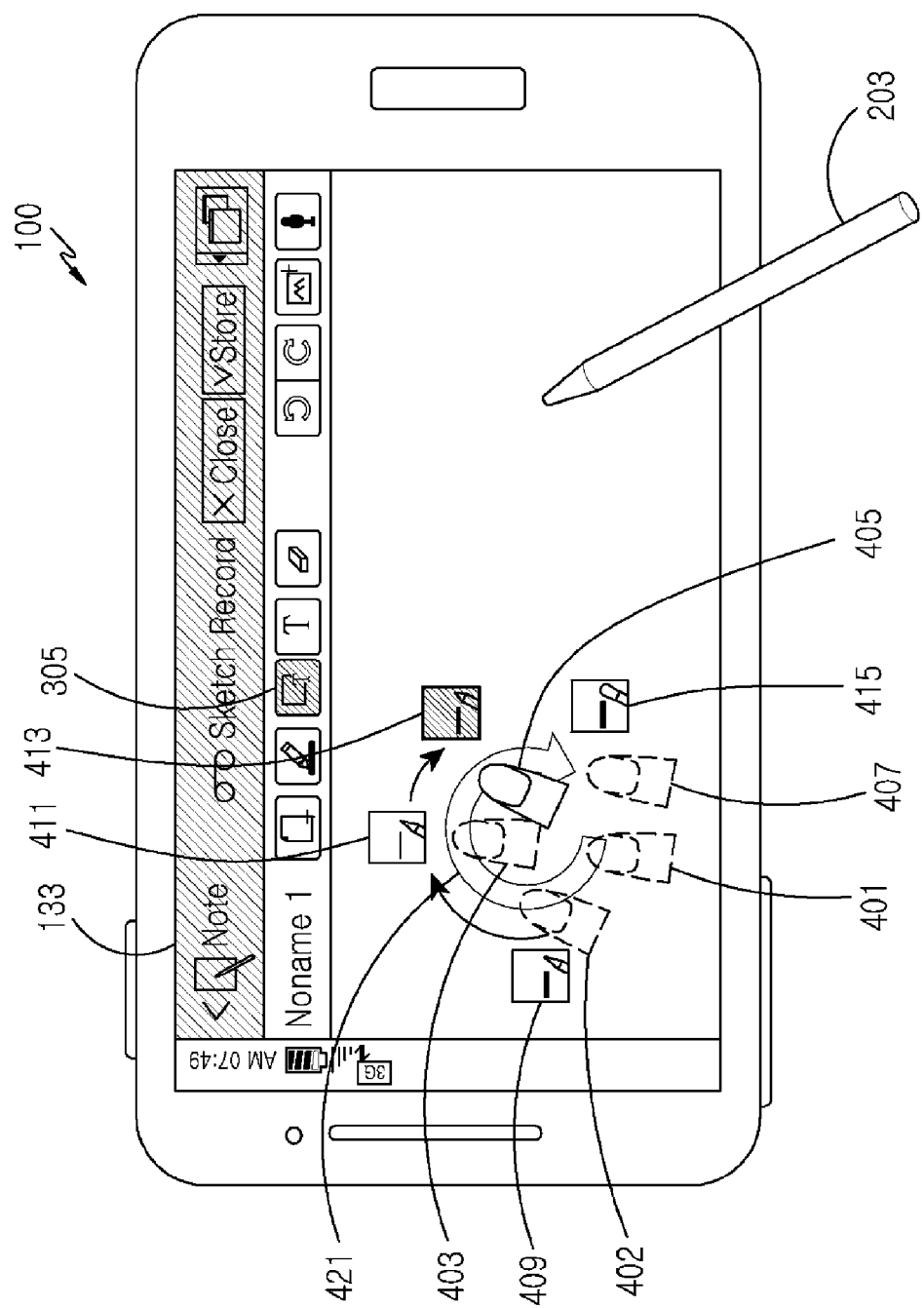

FIGS. 4A and 4B are diagrams illustrating an operation based on an input in the electronic device according to an embodiment of the present invention.

The electronic device 100 previously determines an operation corresponding to a predetermined gesture while in a second input mode. The predetermined gesture is one that touches a predetermined area of the touch screen 133 with the first input means and that drags a reference length or more clockwise or counterclockwise while maintaining the touch and that releases the touch. A function corresponding to a gesture of the first input means is performed based on the predetermined gesture using the first input means while in a second input means input mode.

Referring to FIG. 4A, the electronic device 100 performs a corresponding function of the electronic device 100 through a predetermined gesture of the first input means in a second input means input mode.

For example, while in the second input means input mode, a user of the electronic device 100 may perform a gesture that touches 401 a predetermined area of the touch screen 133 with the first input means and that drags 421 a reference length or more clockwise while maintaining the touch and that releases the touch at a position 407 and may select one of various effects that applies to an input of the electronic device 100.

The electronic device 100 determines a start point based on the touching 401 of a predetermined area of the touch screen 133 and dragging while drawing a circular arc clockwise. When the drag satisfies a reference length, the electronic device 100 displays icons for various effects 409, 411, 413, and 415 (a kind of a drawing tool such as a fountain pen, a pencil, and a pastel) that applies to an input of the electronic device 100.

Further, the electronic device generates a start point based on the touching 401 of a predetermined area of the touch screen 133 with the first input means and the starting of a drag operation 421 that draws a circular arc with the first input means at the start point. The electronic device 100 estimates a trajectory that can form a circle through the drag operation and determine a length that can acquire a virtual circle through the trajectory.

Referring to FIG. 4A, the electronic device 100 generates a start point based on the touching 401 of a predetermined area of the touch screen 133 with the first input means, and when a reference length 402, 403, 405, or 407 is satisfied by dragging with the first input means while drawing a circular arc, the electronic device 100 displays icons for various tools 409, 411, 413, and 415 (such as by a plurality of icons) that applies to an input of the electronic device at a corresponding position.

The user of the electronic device 100 may select a tool from the icons for various tools 409, 411, 413, and 415) through a drag operation of drawing a circular arc with the first input means.

The electronic device 100 generates a start point based on the touching 401 of a predetermined area of the touch screen 133 with the first input means, and when a reference length is satisfied by dragging with the first input means while drawing a circular arc, the electronic device 100 displays the icons for various tools 409, 411, 413, and 415 at a position corresponding to the virtual circle. The user of the electronic device may activate a tool 415 by stopping the drag at a position corresponding to a desired tool, such as tool 407, and select the activated tool by releasing the touch.

Referring to FIG. 4B, the electronic device 100 displays the icons for various tools 409, 411, 413, and 415 by dragging clockwise with the first input means clockwise. The user of the electronic device may activate a tool corresponding to a position of the first input means by stopping the drag, and activate another tool by dragging while drawing a circular arc counterclockwise with the first input means in a state in which the touch is not released.

For example, the electronic device 100 generates a start point based on the touching 401 of a predetermined area of the touch screen 133 with the first input means, and displays the icons for various tools 409, 411, 413, and 415 at a position corresponding to a virtual circle that can be acquired with a trajectory of a circular arc by the user of the electronic device dragging a reference length or more while drawing a circular arc with the first input means. The user of the electronic device may activate a tool 413 by stopping dragging at a corresponding position of a desired tool, such as tool 405.

The electronic device 100 displays the icons for the various tools 409, 411, 413, and 415 at a position corresponding to a virtual circle acquired with the first input means. The user of the electronic device may activate a tool 413 by stopping dragging at a corresponding position of a desired tool, such as tool 405, drag while drawing again a circular arc with the first input means in a state in which the touch is not released, and activate another tool.

For example, when selecting a tool 409 in a state in which a tool 413 is activated by stopping dragging of the first input means that drags clockwise at a position 405, the user of the electronic device 100 changes a target of the tool by dragging while drawing a circular arc clockwise in a state in which a touch of the first input means is not released, activate the corresponding tool 409 by dragging while drawing a circular arc clockwise at a a position 407 and stopping dragging at a position 402 with the first input means, and select the activated tool 409 by releasing a touch of the first input means.

In another example, when selecting the tool 409 in a state in which a tool 413 is activated at the position 405 by dragging clockwise the first input means, the user of the electronic device 100 may change a target of the tool by dragging while drawing a circular arc counterclockwise in a state in which a touch of the first input means is not released, activate the corresponding tool 409 by dragging while drawing a circular arc at the position 405 and stopping dragging at position 402 with the first input means, and select the activated tool 409 by releasing a touch of the first input means.

Figure 5B:
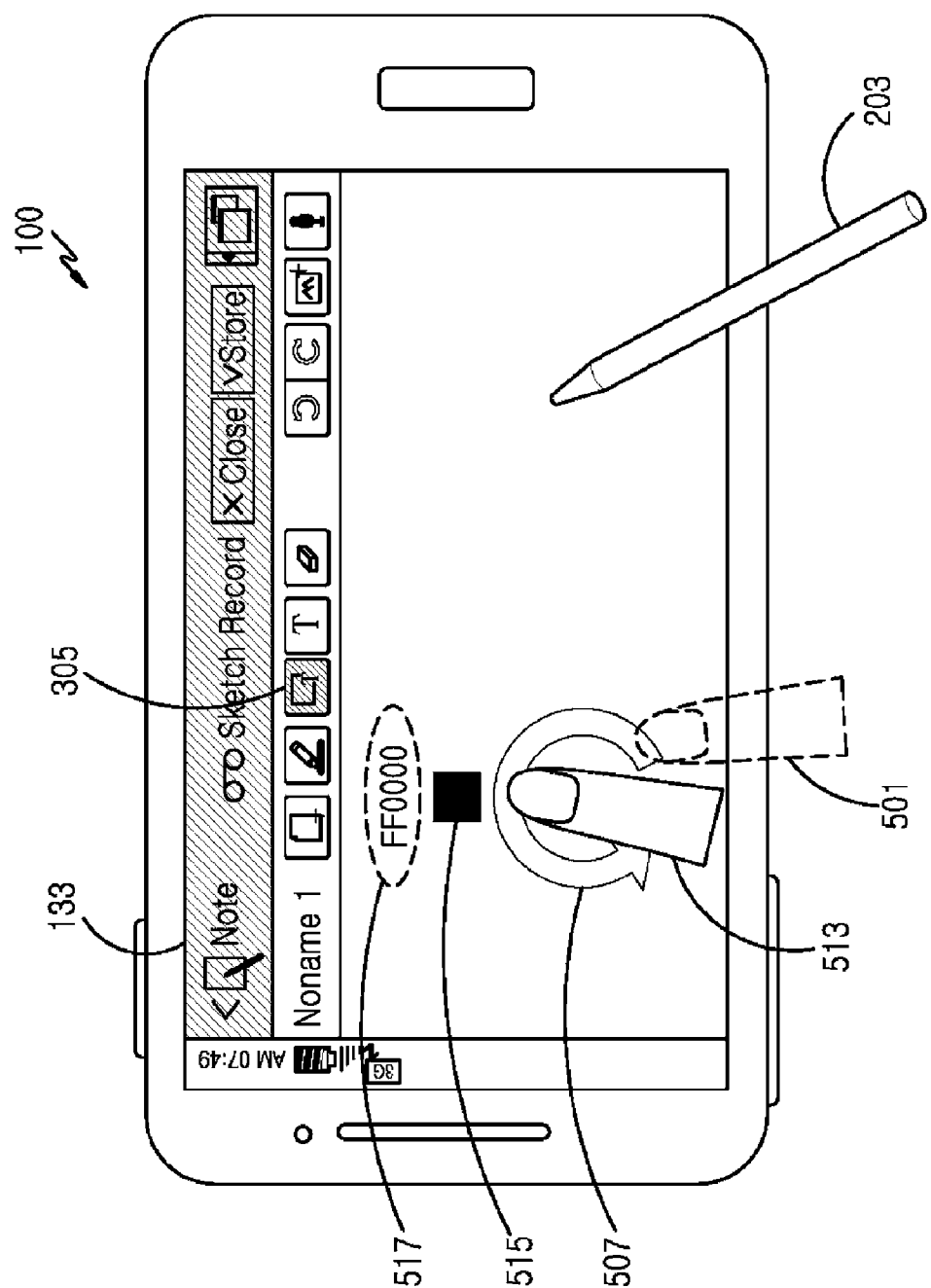

FIGS. 5A and 5B are diagrams illustrating an operation based on an input in the electronic device according to an embodiment of the present invention.

Referring to FIG. 5A, the electronic device 100 performs a corresponding function of the electronic device 100 through a predetermined gesture of the first input means in a second input means input mode.

For example, while in a second input means input mode, user of the electronic device 100 may perform a gesture that touches 501 a predetermined area of the touch screen 133 with the first input means and that drags 507 a reference length or more counterclockwise while maintaining the touch and that releases the touch at a position 502 and may select one of various effects that can apply to an input of the electronic device 100.

The electronic device 100, while in a second input means input mode, generates a start point by touching 501 a predetermined area of the touch screen 133 with the first input means. The user of the electronic device may drag while drawing a circular arc counterclockwise while maintaining the touch of the first input means. When detecting the drag of a reference length or more, the electronic device 100 displays information about a color code that can apply when inputting an instruction through the first input means on the touch screen 133.

For example, when the electronic device 100 detects a counterclockwise drag gesture of the first input means while in a second input means input mode, the electronic device 100 displays a color 503 and/or a color code 505 that applies when inputting a drawing instruction to a predetermined area of the touch screen 133 of the electronic device 100.

In FIG. 5A, the electronic device 100 generates a start point based on the touching 501 of a predetermined area of the touch screen 133 with the first input means. The user of the electronic device may drag with the first input means while drawing a circular arc and then maintaining the touch while positioned at the position 502. The electronic device displays a color 503 (black color displayed) corresponding to the position 502 in a predetermined area of the touch screen 133 and a color code 505 (black code '000000') corresponding to the color 503 or the position 502 in a predetermined area of the touch screen 133.

Referring to FIG. 5B, while in a second input means mode, the user of the electronic device 100 may perform a gesture that touches 501 a predetermined area of the touch screen 133 with the first input means and that drags 507 a reference length or more counterclockwise while maintaining the touch and that releases the touch at a position 502 and may select one of colors that can apply to an input of the electronic device 100.

Further, the user of the electronic device 100 may view various colors that can apply by dragging clockwise or counterclockwise without releasing the touch of the first input means.

For example, in FIG. 5A, the electronic device 100 displays a color 503 corresponding to a position 502 in a predetermined area of the touch screen 133 and display a color code 505 corresponding to the position 502 or the color 503 in a predetermined area of the touch screen 133. The user of the electronic device 100 selects a displayed color by releasing the touch of the first input means and views various colors by dragging the first input means clockwise or counterclockwise while drawing a circular arc while maintaining the touch. At the position 502 of FIG. 5A, the first input means may be dragged clockwise without releasing a touch thereof, dragging may be stopped at a position 513, and when a color code of a color corresponding to the position 513 is 'FF0000', a color 515 of red corresponding to the position 513 may be displayed in a predetermined area of the touch screen 133, and a color code 517 of 'FF0000' corresponding to a color 515 may be displayed in a predetermined area of the touch screen 133.

Further, when the user of the electronic device 100 performs a drag gesture counterclockwise on a touch screen with the first input means, the number of displayed color codes is determined based on the a size of the formed circle. When a size of a virtual circle that can be acquired by the user of the electronic device dragging with the first input means is included in a range of a predetermined size, the electronic device 100 determines and displays a portion of color codes stored at the memory 110 thereof. For example, the electronic device 100 determines a radius length of an estimated virtual circle to be one of a first length, a second length, and a third length by drawing a circular arc on the touch screen 133 with the first input means. The electronic device 100 further determines various ranges such as, less than a first length, equal to a first length or more, less than a second length, and equal to second length or more, and the electronic device 100 displays a portion of color codes included in the memory 110 of the electronic device 100 to corresponding to each range.

Figure 6A:
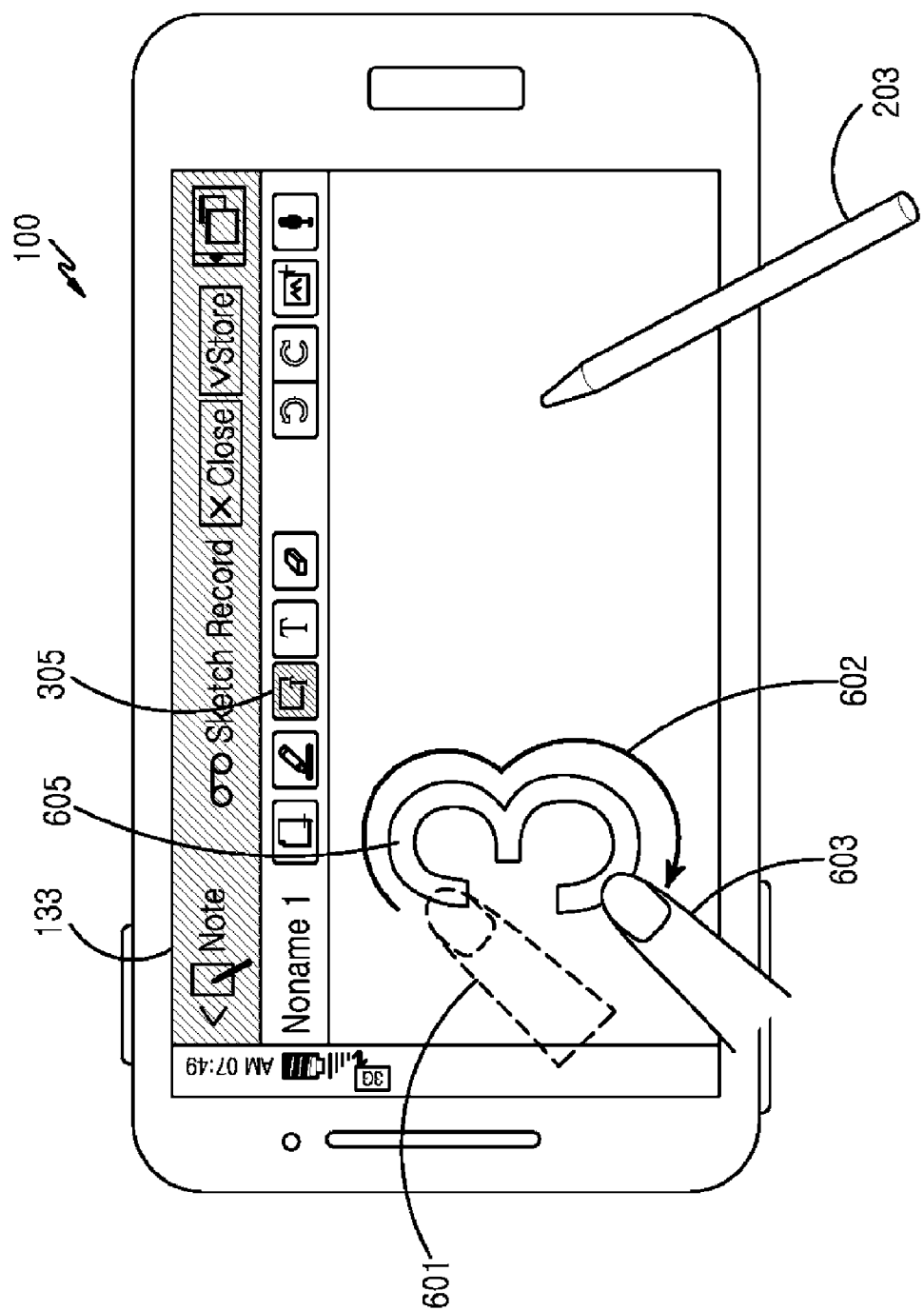
FIG. 6A and FIG. 6B are diagrams illustrating an operation based on an input in the electronic device according to an embodiment of the present invention.
Figure 6B:
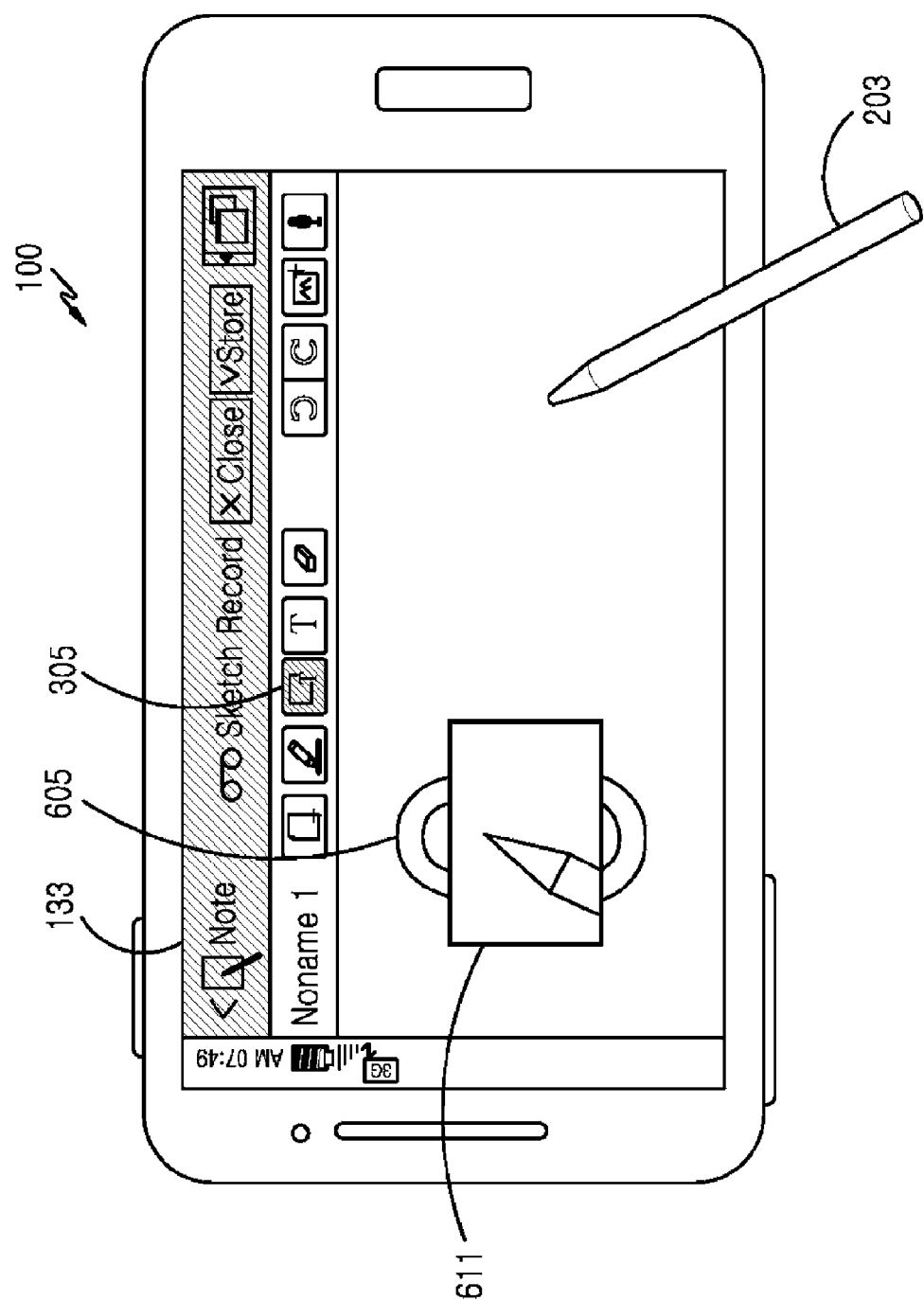

FIG. 6A and FIG. 6B are diagrams illustrating an operation based on an input in the electronic device according to an embodiment of the present invention.

The electronic device 100 previously determines an operation corresponding to a predetermined gesture while in a second input means input mode. The predetermined gesture is one that touches a predetermined area of the touch screen 133 with the first input means and that drags a numeral while maintaining the touch and that releases the touch. A function corresponding to a gesture of the first input means is performed based on the predetermined gesture using the first input means while in a second input means input mode of the electronic device 100.

Referring to FIG. 6A, through an input of the first input means, the electronic device 100 performs a corresponding function of the electronic device 100 through a predetermined gesture.

For example, while in a second input means input mode, the user of the electronic device 100 may perform a gesture that touches 601 a predetermined area of the touch screen 133 with the first input means and that drags 602 a numeral while maintaining the touch and that releases the touch at a position 603, and the electronic device 100 performs an operation corresponding to the gesture.

Referring to FIG. 6B, while in a second input means input mode, the user of the electronic device 100 may select an effect that can apply when inputting an instruction corresponding to a predetermined gesture on the touch screen 133 with the second input means.

For example, the electronic device 100 previously determines effects that can apply when inputting an instruction on the touch screen 133 with a second input means to correspond to numerals, store the effects at the memory 110, and apply a predetermined tool corresponding to a numeral '3'. When inputting an instruction on the touch screen 133 with the second input means, tool 611 corresponding to the numeral '3' is displayed to indicate tool effects that can apply to an input.

Further, in the electronic device 100, when inputting a numeral with the first input means, at least one touch release is necessary for completing a numeral like a numeral '4' or '14' by dragging. In this case, the user of the electronic device 100 may start a numeral input, complete the numeral input within a reference time (a predetermined time period such as 1 second), and determine to complete a numeal input though touch release Further, the electronic device 100 determines an operation of executing another program of the electronic device 100 and an operation of operating a volume in a sound setting of the electronic device 100, as well as an effect that can apply when inputting an instruction on the touch screen 133 with the second input means with an operation corresponding to a numeral input by dragging with the first input means.

In the second input means input mode, an operation corresponding to a numeral input by dragging with the first input means may be a volume control operation of music reproduced on the electronic device 100, and when inputting a numeral '3' by dragging 602, as shown in FIG. 6A, the electronic device 100 may control a volume of reproducing music to a magnitude corresponding to '3'.

Figure 7A:
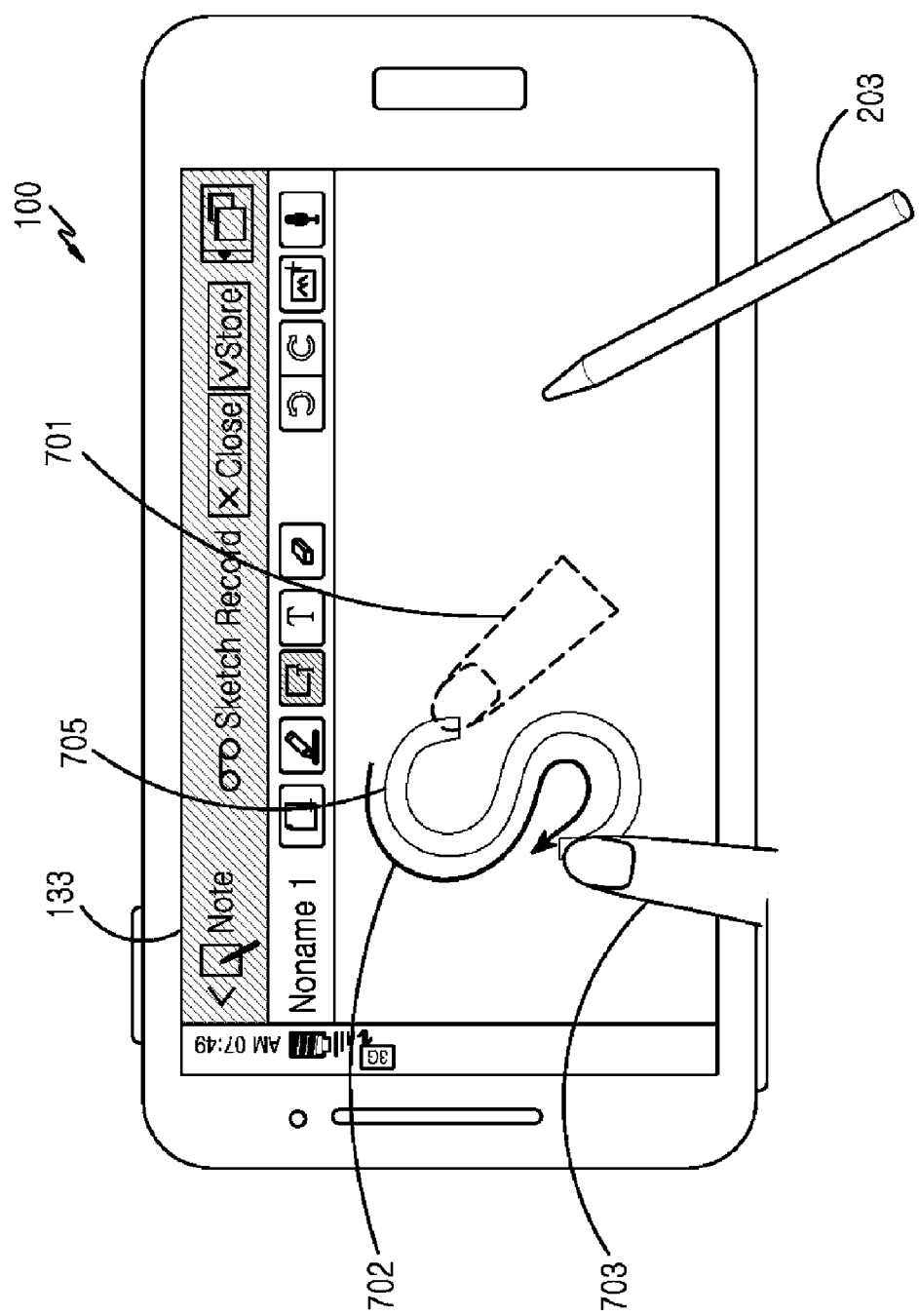
FIGS. 7A and 7B are diagrams illustrating an operation based on an input in the electronic device according to an embodiment of the present invention.
Figure 7B:
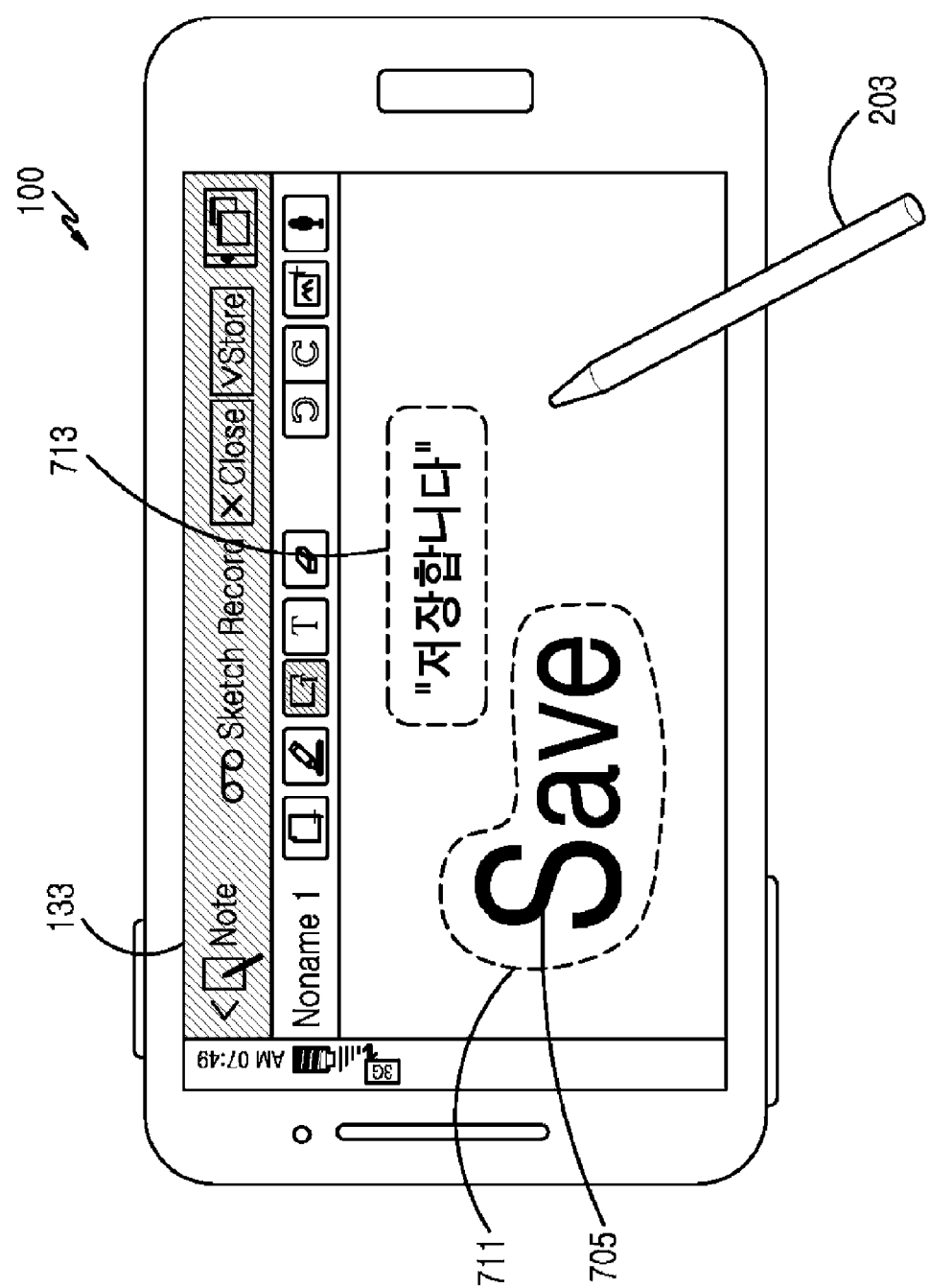

FIGS. 7A and 7B are diagrams illustrating an operation based on an input in the electronic device according to an embodiment of the present invention.

The electronic device 100 previously determines an operation corresponding to a predetermined gesture while in a second input means input mode. The gesture is one that touches a predetermined area of the touch screen 133 with an input of the first input means and that drags a text while maintaining the touch and that releases the touch. A function corresponding to a gesture of the first input means is performed based on the predetermined gesture using the first input means while in a second input means input mode of the electronic device 100.

Referring to FIG. 7A, while in a second input means input mode, the electronic device 100 generates a start point based on the touching 701 of a predetermined area of the touch screen 100 with the first input means. The user of the electronic device may input a text 'S' 705 by dragging 702 the first input means, and release the touch at a position 703, and the electronic device 100 performs an operation corresponding to a predetermined text 'S' 705.

Further, when the user of the electronic electronic device 100 inputs a text with the first input means, at least one time touch release is necessary for completing a text such as the Korean alphabet or English alphabet 'T' or "E". In this case, the user of the electronic device 100 may start a numeral or text input, complete a numeral or text input within a reference time (a predetermined time period such as 1 second), and the electronic device controls to determine to complete a numeal input though touch release.

Referring to FIG. 7B, the electronic device 100 executes operation corresponding to an input through the first input means while in a second input means input mode, form a UI of a corresponding operation, and display the UI on the touch screen 133 of the electronic device 100 or output the UI as a sound through the speaker 141.

The user of the electronic device 100 may input a text 'S' 705 (by performing a gesture of a touch, a drag while maintaining the touch, and touch release) with the first input means, as shown in FIG. 7A and the electronic device performs the operation of storing a state of a present program corresponding to the text 'S'. The electronic device 100 may form a state when performing a storage operation corresponding to the text 'S' 705 that is input with the first input means with a UI (a word 'save' 711 that may represent a storage operation) representing an operation that includes and stores the text 'S' 705 that is input with the first input means and may display the UI in a predetermined area of the touch screen 133 or may display a word 'store' that may represent a storage operation, as shown in 713 in a predetermined area on the touch screen 133.

Further, the electronic device 100 determines to perform various functions or operations of the electronic device 100 as well as a storage operation of FIG. 7B to correspond to a text or a symbol that is input with the first input means with operation corresponding to a text input with the first input means.

Further, when describing an various embodiment of the present invention, as shown in FIGS. 2A to 7B, although not shown, the electronic device 100 may determine a plurality of functions or operations corresponding to a gesture input with the first input means and may determine to display a menu including an icon corresponding to a plurality of functions or operations in a predetermined area of the touch screen 133.

Figure 8:
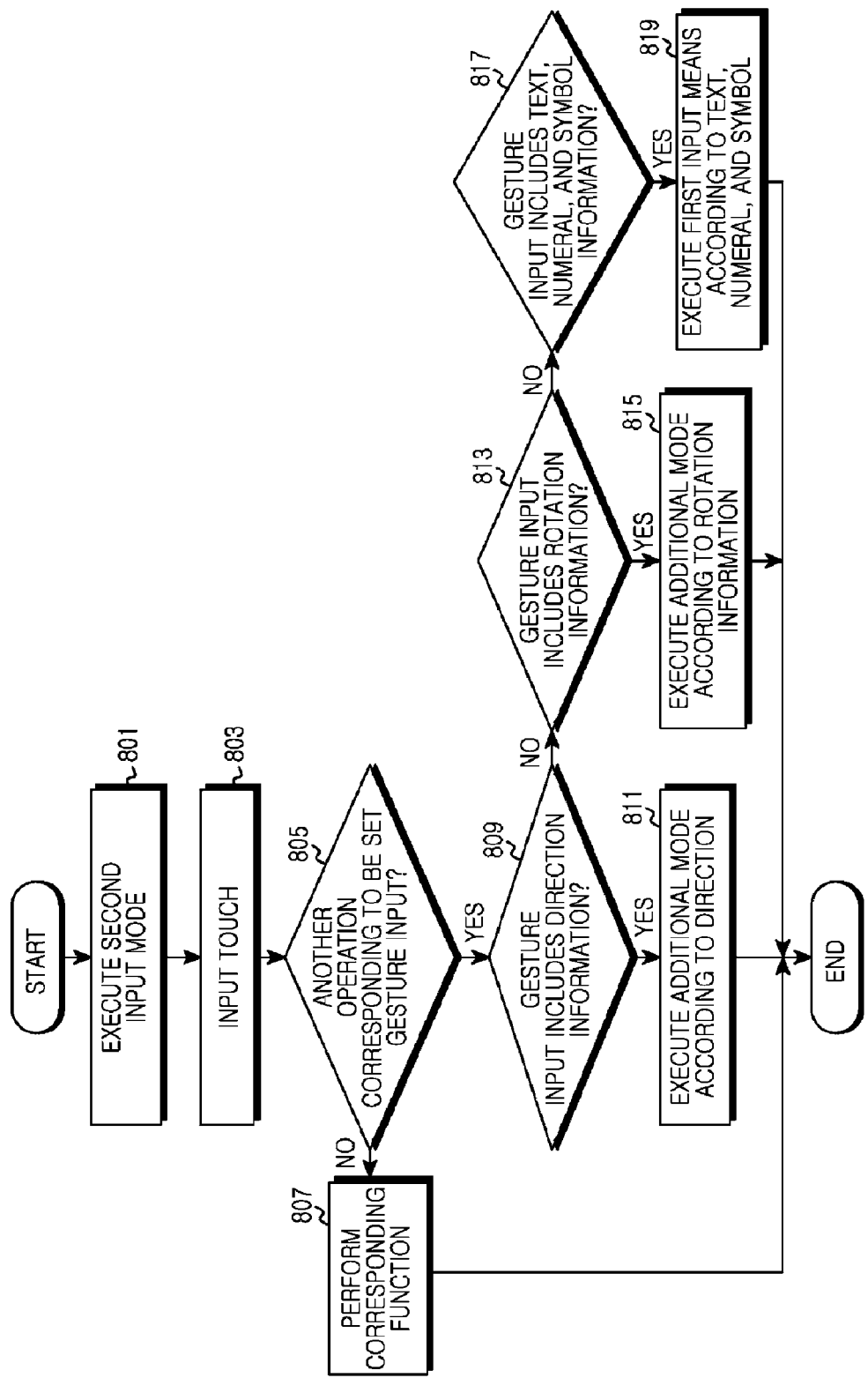
FIG. 8 is a flowchart illustrating an input processing of an electronic device according to an embodiment of the present invention.

FIG. 8 is a flowchart illustrating detailed operation of an electronic device according to an embodiment of the present invention.

Referring to FIG. 8, the electronic device 100 is in a second input means input mode in step 801, inputs an instruction on the touch screen 133 with the first input means in step 803, an input of the first input means may be a one point touch or at least two point touches, and determines whether there is another operation set to correspond to the input in step 805. If there is not another operation corresponding to the input, then the electronic device 100 performs the corresponding function in step 807. If there is another operation corresponding to the input, then the electronic device 100 determines whether the input of the first input means includes a predetermined direction in step 809. If the input does include a predetermined direction, then the electronic device 100 executes the operation corresponding to an input of the first input means while in the second input means input mode according to the direction in step 811. If the input does not include a predetermined direction, then the electronic device 100 determines whether the input of the first input means includes predetermined rotation information in step 813. If the input does include predetermined rotation information, then the electronic device 100 executes the operation corresponding to an input of the first input means while in the second input means input mode according to the rotation information in step 815. If the input does not include predetermined rotation information, then the electronic device 100 determines whether the input of the first input means includes a predetermined text, numeral or symbol in step 817. If the input does include a predetermined text, numeral or symbol, then the electronic device 100 executes the operation corresponding to an input of the first input means while in the second input means input mode according to the text, numeral or symbol in step 819. If the input does not include a predetermined text, numeral or symbol, the electronic device 100 terminates the operation.

In step 801, the electronic device 100 executes a second input means input mode. When performing the second input means input mode, the electronic device 100 controls to perform an operation corresponding to a predetermined input through the first input means.

In the electronic device 100, in order to input an instruction through the touch screen 133 with a first input means or a second input means, the touch screen 133 includes a first input means input device (may be the touch input device 132 shown in FIG. 1) for inputting with the first input means and/or a second input means input device (may be the pen input device 134 shown in FIG. 1) for inputting with the second input means.

The electronic device 100 determines differently, an operation corresponding to an input of the first input means while in a mode other than the second input means input mode and an operation corresponding to an input of the first input means while in the second input means input mode.

In the electronic device 100, while in the second input means input mode (may be a common touch mode), an operation corresponding to a gesture input of a touch, drag, and touch release of the first input means may be a scrolling operation of a UI configuration displayed on the touch screen 133 of the electronic device 100, and the electronic device 100 determines to perform an operation corresponding to a gesture input with reference to FIGS. 2A to 7B with an operation corresponding to the gesture input of the touch, drag, and touch release of the first input means while in the second input means input mode.

In an embodiment of the present invention, while in a mode other than the second input means input mode, the user of the electronic device 100 may perform a scrolling operation with an operation corresponding to a gesture input of a touch, drag, and touch release of the first input means, and while in the second input means input mode, an operation corresponding to a gesture input of a touch, drag, and touch release of the first input means may be a storage operation of an executing program state of the electronic device 100 corresponding to a text 'S' that is input with a drag operation with reference to FIG. 7B.

The electronic device 100 controls to perform a predetermined operation to correspond to an input of the first input means while in the second input means input mode.

In step 803, the user of the electronic device 100 may input an instruction that can perform in the electronic device 100 with the first input means and/or the second input means through the touch screen 133.

The electronic device 100 performs an operation corresponding to a gesture through a predetermined gesture of one time touch and two times touches of an UI object displayed on the touch screen 133 or a predetermined area of the touch screen 133 with the first input means, standby for a predetermined time while maintaining the touch after one time touch, or a touch, drag, and touch release.

While in the second input means input mode, the user of the electronic device 100 may input a predetermined gesture with the first input means and the electronic device determines whether an operation corresponding to a gesture input with the first input means corresponds to a predetermined operation of the electronic device 100.

In step 805, the electronic device 100 determines whether another operation that is set to correspond to the gesture input with the first input means exists.

In the electronic device 100, while in a common touch input mode (a state other than the second input means input mode), an operation corresponding to a gesture that touches a predetermined area of the touch screen 133 with the first input means and that drags in a downward direction while maintaining the touch and that releases the touch may be an operation scrolling UI objects displayed on the touch screen 133 of the electronic device 100, and while in the second input means input mode, an operation corresponding to a gesture that touches a predetermined area of the touch screen 133 with the first input means and that drags in a downward direction while maintaining the touch and that releases the touch may be an operation other than scrolling operation.

Here, a gesture input with the first input means is not limited to a predefined gesture so as to control an operation of the electronic device in a common touch input mode (a state other than the second input means input mode), and a new gesture that can be used while in the second input means input mode may be determined to control a corresponding operation.

A new gesture may be defined by a pattern that is input by a user of the electronic device. For example, the user of the electronic device may input a pattern that indicates a trajectory formed with by touching a predetermined area of the touch screen 133, dragging while maintaining the touch, and releasing the touch. The electronic device 100 detects the touch, movement (drag), and touch release and recognize a pattern to define as a new gesture.

For example the gesture input with the first input means may be a one point touch or at least two point touches.

When inputting an instruction on the touch screen 133 with the first input means, the user of the electronic device 100 may input a gesture with one touch point on the touch screen 133 with the first input means and may simultaneously input a gesture with at least two touch points on the touch screen 133 with the first input means.

When an operation corresponding to a gesture input with the first input means on the touch screen 133 while in the second input means input mode is the same as operation corresponding to a gesture input with the first input means while in a common touch input mode, the electronic device 100 performs step 807, and when an operation corresponding to a gesture input with the first input means on the touch screen 133 while in the second input means input mode is not the same as operation corresponding to a gesture input with the first input means while in a common touch input mode, the electronic device 100 performs step 809.

In step 807, the electronic device 100 performs an operation corresponding to a gesture input on the touch screen 133 with the first input means.

A gesture that simultaneously touches two touch points on the touch screen 133 with the first input means and that drags long or shortly a length between touch points while maintaining the touch and that releases the touch is an extension or reduction operation of an object that displays on the touch screen 133 while in a common touch input mode, and when performing the same operation while in the second input means input mode, i.e., when inputting a gesture that simultaneously touches two touch points of the touch screen 133 with the first input means and that drags long or shortly a length between touch points while maintaining the touch and that releases the touch in the second input means input mode, the electronic device 100 controls to perform an extension or reduction operation of an object displayed on the touch screen 133 with operation corresponding thereto.

In step 809, the electronic device 100 determines whether the gesture input through the first input means includes direction information, and if the gesture input through the first input means includes direction information, the electronic device 100 acquires direction information from a drag operation of a gesture input with the first input means while in the second input means input mode.

As shown in FIGS. 2A, 2C, 3A, and 3B, the user of the electronic device 100 may input a gesture that touches a predetermined area of the touch screen 133 with the first input means and that drags a predetermined length or more in a downward direction, a upward direction, a left direction, or a right direction while maintaining the touch and that releases the touch, and the electronic device 100 determines whether a gesture input through the first input means includes information about a downward direction, a upward direction, a left direction, or a right direction.

If the gesture input through the first input means includes information about a direction, the electronic device 100 performs step 811, and if a gesture input through the first input means includes information other than information about a direction, the electronic device 100 performs step 813 or terminates the operation of FIG. 8.

In step 811, the electronic device 100 performs an operation corresponding to the gesture input with the first input means in the second input means input mode.

The electronic device 100 displays a menu 209 that provides various functions necessary for a gesture input that draws a picture or that, while in the second input means input mode, writes a text with the second input means on the touch screen 133 of FIG. 2A with an operation corresponding to a gesture that touches 205 a predetermined area of the touch screen 133 of FIG. 2A with the first input means and that drag 206 a reference length or more in a downward direction while maintaining the touch and that releases the touch at a position 207.

In another example, referring to FIG. 3A, the electronic device 100 changes focusing 304 of an focused on function icon 201 that can set a tool of a drawing function to a function icon 305 that can set an inputting figure or to a function icon 315 that can set hand writing. The focusing change 304 is performed while in the second input means input mode, with an operation corresponding to a gesture that touches 301 a predetermined area of the touch screen 133 with the first input means and that drags 302 a reference length or more in a right direction while maintaining the touch and that releases the touch at a position 303.

The electronic device 100 determines and uses various gesture inputs including direction information and operations corresponding to the gesture inputs as well as a gesture input that drags in a downward direction or that drags in a right direction input with the first input means.

In step 813 the electronic device 100 determines whether the gesture input through the first input means includes rotation information, and if the gesture input through the first input means includes rotation information, the electronic device 100 acquires rotation information from a drag operation of the gesture input with the first input means while in the second input means input mode.

As shown in FIGS. 4A to 5B, the user of the electronic device 100 may input a gesture that touches a predetermined area of the touch screen 133 with the first input means and that drags a predetermined length or more clockwise or counterclockwise while maintaining the touch and that releases the touch, and the electronic device 100 determines whether the gesture input through the first input means includes information about a clockwise or counterclockwise rotation.

If the gesture input through the first input means includes information about a rotation, the electronic device 100 performs step 815, and if a gesture input through the first input means includes information other than information about a rotation, the electronic device 100 performs step 817 or may terminate operation of FIG. 8.

In step 815, the electronic device 100 performs an operation corresponding to a gesture input with the first input means while in the second input means input mode.

The electronic device 100 displays icons for various tools 409, 411, 413, and 415 that provide a type of pen that applies to a gesture input that draws a picture or writes a text on the touch screen 133, as shown in FIG. 4B, through a second input means. While in the second input means input mode, the display icons for various tools 409, 411, 413, and 415 are displayed with an operation corresponding to a touch 401, as shown in FIG. 4A, of a predetermined area of the touch screen 133 with the first input means, a drag 421 while drawing a circular arc clockwise while maintaining the touch, and touch release.

In another example, referring to FIG. 5B, the electronic device 100 displays color 515 and color code 517 that provide a color that can apply to a gesture input that draws a picture or writes a text on the touch screen 133 through a second input means. While in the second input means input mode, the color 515 and color code 517 are displayed with an operation corresponding to a gesture that touches 301 a predetermined area of the touch screen 133 with the first input means and that drags 507 while drawing a circular arc counterclockwise while maintaining the touch and that releases the touch at a position 303.

The electronic device 100 determines and uses various gesture inputs including rotation information through a drag as well as a gesture input that drags clockwise or counterclockwise that inputs with the first input means and operation corresponding to the gesture input.

In step 817, he electronic device 100 determines whether the gesture input through the first input means includes text, numeral, and symbol information, and if the gesture input through the first input means includes text, numeral, and symbol information, the electronic device 100 acquires text, numeral, and symbol information from a drag operation of the gesture input with the first input means while in the second input means input mode.

As shown in FIGS. 6A to 7B, the electronic device 100 determines whether a gesture that touches a predetermined area of the touch screen 133 with the first input means and that drags while maintaining the touch (when inputting a text, a numeral, or a symbol through a drag, a condition where touch release is necessary for completing the text, the numeral, or the symbol and is completed within a reference time) and that releases the touch includes information about a text, a numeral, or a symbol.

If the gesture input through the first input means includes information about a text, numeral or symbol, the electronic device 100 performs step 819, and if a gesture input through the first input means includes information other than information about a text, numeral or symbol, the electronic device 100 terminates the operation of FIG. 8.

In step 819, the electronic device 100 performs an operation corresponding to the gesture input with the first input means while in the second input means input mode.

The electronic device 100 selects effects that can apply to a gesture input that draws a picture or writes a text on the touch screen 133 through a second input means corresponding to a numeral '3', as shown in FIG. 6B. Where the selection is performed with an operation corresponding to a touch 601 of a predetermined area of the touch screen 133, as shown in FIG. 6A, with the first input means, a drag 602 of a numeral '3' while maintaining the touch, and a touch release at a position 603 while in the second input means input mode.

In another example, in a second input mode, the electronic device 100 performs an operation of storing a state of an executing program corresponding to an input of a text 'S', as shown in FIG. 7B, with an operation corresponding to a touch 701 of a predetermined area of the touch screen 133 with the first input means, a drag 702 of a text 'S' while maintaining the touch, and a touch release at a position 703 and displays, in a predetermined area of the touch screen 133, as shown in 711 and 713, a result representing that the storage operation has been performed.

The electronic device 100 determines and uses various gesture inputs including information about various geometrical figures through a drag and through operations corresponding to the gesture inputs, as well as a gesture inputs that drag a text, a numeral, or a symbol input with a first input means.

When the electronic device 100 performs steps 811, 815, or 819 of FIG. 8, the electronic device 100 terminates the operation of FIG. 8.

Figure 9:
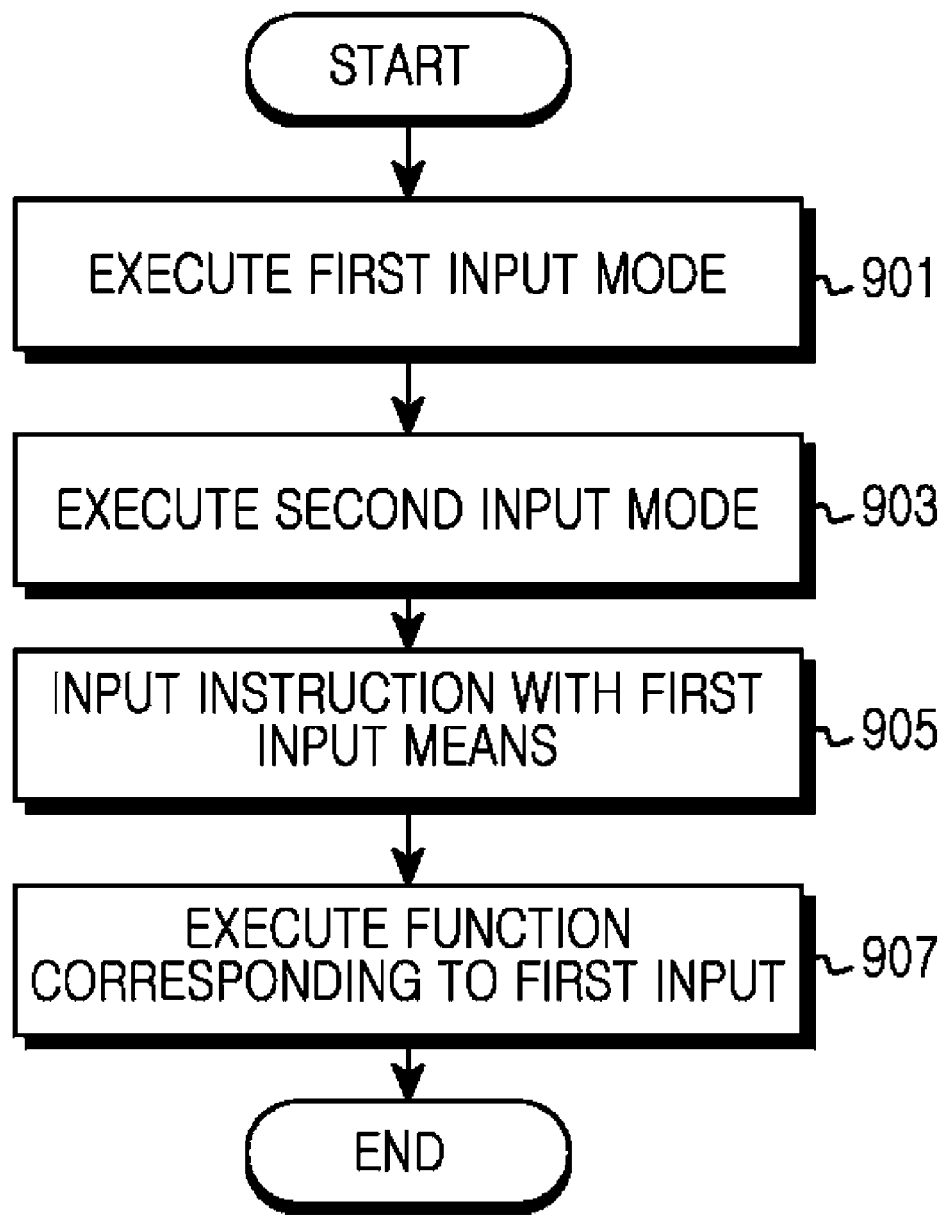
FIG. 9 is a flowchart illustrating an operation of an electronic device according to an embodiment of the present invention.

FIG. 9 is a flowchart illustrating an operation of an electronic device according to an embodiment of the present invention.

As a device for inputting an instruction, the electronic device 100 may include an input device through a first input means and/or an input device through a second input means at the touch screen 133.

Referring to FIG. 9, the electronic device 100 executes a first input mode and execute a second input mode, input an instruction with the first input means while in the second input mode, and perform a function corresponding to an instruction that inputs with the first input means.

Hereinafter, an embodiment of the present invention which provides an operation method of the electronic device 100 using a first input means input mode and/or a second input means input mode will be described.

In step 901, the electronic device 100 executes a first input means input mode (first input mode) that can input an instruction with the first input means.

The user of the electronic device 100 may generally input an instruction on the touch screen 133 through the first input means. The first input means may be an input means corresponding to a capacitive type, a resistive (pressure detection) type, an infrared ray type, an electromagnetic induction type, and an ultrasonic wave type and the user may use a hand or a finger as a typical capacitive input means. The first input means may be a touch input method using in a general electronic device.

The user of the electronic device 100 may input an instruction to a first input means input device (the touch input device 132) included in the touch screen 133 through a method of touching with the first input means or dragging while maintaining the touch.

In step 903, the electronic device 100 executes a second input means input mode (second input mode) that can input an instruction with a second input means. When the electronic device 100 executes the second input means input mode, the first input means input mode is not turned off.

The electronic device 100 inputs an instruction to the electronic device through the detachable second input means, and the second input means may be connected to the Electronic device 100 through short range wireless communication of Bluetooth™ or Wi-FI and may use a stylus pen or an electronic pen as a typical input means.

Further, when the electronic device 100 is executed in the second input means input mode, in order to prevent an unintended function of the electronic device 100 from being executed by an unintended input through the first input means, an instruction that is input with the first input means may be received, and the electronic device 100 is controlled to not perform a function or operation of the electronic device 100 in a first input means input mode corresponding to an input instruction. The operation may be a palm rejection operation using the electronic device 100.

The user of the electronic device 100 may input an instruction to the second input means input device (the pen input device 134) included in the touch screen 133 through a method of touching with the second input means or dragging while maintaining the touch. Further, when the second input means includes a touch sensor (not shown) or a button (not shown) that can control to transmit and receive data to and from the electronic device 100 or the second input means input device 134, an instruction may be input through the touch sensor or the button.

In step 905, the user of the electronic device 100 inputs an instruction with the first input means while in the second input means input mode.

The electronic device 100 previously determines an instruction that may input with the first input means while in the second input means input mode, previously determines a function or operation of the electronic device 100 corresponding to the predetermined instruction, and stores the pre-determined instruction and/or data about the corresponding function or operation of the electronic device 100 at the memory 110.

Referring to FIGS. 2A to 7B or operation 809, 813, or 817 of FIG. 8, the user of the electronic device 100 may input an instruction by performing a gesture of a touch of a predetermined area of the touch screen 133 with the first input means, a drag that satisfies a reference length or a reference time in a upward direction, a downward direction, a left direction, or a right direction while maintaining the touch, and touch release.

In another example, the user of the electronic device 100 may input an instruction by performing a gesture that touches a predetermined area of the touch screen 133 with the first input means and that drags a reference length or more while drawing a circular arc clockwise or counter-clockwise while maintaining the touch and that releases the touch.

In another example, the user of the electronic device 100 may input an instruction by performing a gesture that touches a predetermined area of the touch screen 133 with the first input means and that drags a text, a numeral, or a symbol and that releases the touch. The operation of dragging a text, a numeral, or a symbol may be determined to execute a corresponding function or operation of the electronic device 100 when starting the touch and input according to a reference time.

In step 907, the electronic device 100 executes a function or operation thereof corresponding to an instruction input with the first input means.

The electronic device 100 controls an instruction that is input with the first input means to execute a corresponding function or operation when inputting according to a reference length and/or a reference time.

Referring to FIGS. 2A to 7B or operation 811, 815, or 819 of FIG. 8, when inputting an instruction on the touch screen 133 with a second input means to correspond to a drag gesture of the first input means, the electronic device 100 provides a menu that can select various effects (tool, kind, and color setting) that can apply to an overlay image or a trajectory corresponding to an input of the second input means, change focusing applying to one of a plurality of function icons displayed on the touch screen 133 to correspond to a drag operation, and perform a function (e.g., store a state of an executing program corresponding to a text 'S') of the electronic device 100 corresponding to a text that is input by a drag.

A gesture input with the first input means and an operation of the electronic device 100 corresponding to the gesture are not limited to the description described with reference to FIGS. 2A to 8. Also, an operation of the electronic device 100 corresponding to the first input means may be set differently according to whether the user device is in a first input means input mode or in a second input means input mode where the input mode is controlled according to a setting.

As described above, in various embodiments of the present invention, in a pen input mode of an electronic device, a function is set to correspond to various hand touch gestures using a hand touch input and a setting for a pen input may be simply controlled in a pen input mode.

A method of an electronic device enters a first input mode that receives input with a first input means and a second input mode that receives input with a second input means, receives a touch input from the first input means, and performs a predetermined function corresponding to the touch input, wherein the function corresponding to the touch input is different based on whether the electronic device is in the first input mode or the second input mode. Wherein the plurality of objects are icons arranged in parallel on the touch screen of the electronic device.

Methods according to various embodiments described herein can be implemented in a form of hardware components, software components, or combinations thereof.

When implemented by software components, a non-transitory computer readable storage medium that stores at least one program (software module) may be provided. At least one program stored at a non-transitory computer readable storage medium is formed to execute by at least one processor within the electronic device 100. At least one program may include an instruction that enables the electronic device 100 to execute a method according to various embodiments described in claims or a specification of the present invention.

An electronic device, comprising a touch screen; and at least one processor, wherein in a state that enters a first input mode that receives input with a first input means, and a second input mode that receives input with a second input means, the processor is configured to receive a touch input of the first input means and to perform a function corresponding to the touch input, and wherein the function corresponding to the touch input is different based on whether the input mode of the electronic device is the first input mode or the second input mode. The processor is configured to change the function corresponding to the touch input when entering the second input mode. The processor is configured to change a program corresponding to the touch input according to a program used in the second input mode. The processor is configured to change the corresponding function according to the drag length. The processor is configured control an operation of touching a predetermined area of the touch screen, an operation of focusing on one of a plurality of objects displayed on the touch screen of the electronic device by dragging longer than or equal to a reference length, and an operation of selecting the focused on object by releasing the touch input.

Such a program (software module, software) may be stored at a non-volatile memory including a random access memory (RAM) and a flash memory, a read-only memory (ROM), an electrically erasable and programmable read only memory (EEPROM), a magnetic disk storage device, a compact disk ROM (CD-ROM), a digital versatile disk (DVD), or an optical storage device of other form, and a magnetic cassette. Alternatively, the program may be stored at a memory formed with a combination of a portion or the entire thereof. Further, each constituent memory may be included in plural.

Further, the program may be stored at an attachable storage device that may access the electronic device 100 through a communication network such as Internet, intranet, a Local Area Network (LAN), a Wireless LAN (WLAN), or a Storage Area Network (SAN), or a communication network formed with a combination thereof. Such a storage device can access the electronic device 100 through an external port.

Further, a separate electronic device on the communication network may access the electronic device 100.

While the present invention has been particularly shown and described with reference to embodiments thereof, it will be understood by those skilled in the art that various changes in form and details may be made therein without departing from the spirit and scope of the present invention as defined by the appended claims.

The invention claimed is:

1. An electronic device, comprising:
a touch screen configured to receive at least one of a touch input or a pen input; and
at least one processor configured to operate in a first input mode based on a the touch input inputted by a finger of a user or a second input mode based on the pen input inputted by an electronic pen,
wherein
the at least one processor is configured to:
execute the second input mode,
receive the touch input in the second input mode,
identify whether the electronic pen is detected in the second input mode,
in response to identifying that the electronic pen is detected in the second input mode:
determine whether the touch input is a predetermined input of the second input mode,
perform, when the touch input is the predetermined input, a predetermined function corresponding to the touch input, wherein the predetermined function is different from a function corresponding to the touch input in the first input mode, and
in response to identifying that the electronic pen is not detected in the second input mode, perform the function corresponding to the touch input in the first input mode.

2. The electronic device of claim 1, wherein the touch input received in the second input mode comprises a drag longer than or equal to at least one of a reference length and a reference time.

3. A method of operating an electronic device, the method comprising:
executing a second input mode between a first input mode based on a touch input inputted by a finger of a user and the second input mode based on a pen input inputted by an electronic pen;
receiving the touch input in the second input mode;
identifying whether the electronic pen is detected in the second input mode,
in response to identifying that the electronic pen is detected in the second input mode:
determining whether the touch input is a predetermined input of the second input mode; and
performing, when the touch input is the predetermined input, a predetermined function corresponding to the touch input, wherein the predetermined function is different from a function corresponding to the touch input in the first input mode; and
in response to identifying that the electronic pen is not detected in the second input mode, performing the function corresponding to the touch input in the first input mode.

4. The method of claim 3, wherein the predetermined function is a function corresponding to an object selected from at least one object displayed on a touch screen of the electronic device.

5. The method of claim 3, wherein the touch input received in the second input mode is a drag longer than or equal to at least one of a reference length and a reference time.

6. The method of claim 3, wherein the touch input received in the second input mode comprises:
an operation of touching a predetermined area of a touch screen of the electronic device;
an operation of dragging in one of an upward direction, a downward direction, a left direction, and a right direction on the touch screen while maintaining the touch input; and
an operation of releasing the touch input.

7. The method of claim 6, wherein the operation of dragging further comprises an operation of focusing on one of a plurality of objects displayed on the touch screen of the electronic device.

8. The method of claim 7, wherein the focused on object is changed to a different object according to the dragging operation.

9. The method of claim 3, wherein the touch input received in the second input mode comprises:
an operation of touching a predetermined area of the touch screen of the electronic device;
an operation of dragging while drawing a circular arc clockwise or counterclockwise while maintaining the touch input; and
an operation of releasing the touch input.

10. The method of claim 9, wherein the dragging operation is maintained until an overlay image that draws a circular arc corresponding to the dragging operation determines a virtual circle.

11. The method of claim 3, wherein the touch input received in the second input mode comprises:
- an operation of touching a predetermined area of the touch screen of the electronic device;
- an operation of drawing one of a shape of a text, a shape of a numeral, and a shape of a symbol while maintaining the touch input; and
- an operation of releasing the touch input.

12. The method of claim 11, wherein the operation of drawing one of the shape of the text, the shape of the numeral, and the shape of the symbol determines a touch release necessary configure to complete the drawing by dragging with an operation other than the release of the touch input.

13. The method of claim 12, wherein the operation of drawing one of the shape of the text, the shape of the numeral, and the shape of the symbol is complete within a predetermined time period.

\* \* \* \* \*